US012677232B2

(12) United States Patent
Logothetis et al.

(10) Patent No.: US 12,677,232 B2
(45) Date of Patent: Jul. 7, 2026

(54) TIMING ADVANCE CALCULATION

(71) Applicant: AIRSPAN IP HOLDCO LLC, Boca Raton, FL (US)

(72) Inventors: Andrew Logothetis, High Wycombe (GB); Honey Kanwar Singh Sarao, Slough (GB)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 373 days.

(21) Appl. No.: 18/408,019

(22) Filed: Jan. 9, 2024

(65) Prior Publication Data

US 2024/0292356 A1     Aug. 29, 2024

(30) Foreign Application Priority Data

Feb. 24, 2023     (GB) ...................................... 2302667

(51) Int. Cl.
*H04W 56/00*          (2009.01)
(52) U.S. Cl.
CPC ............................... *H04W 56/0045* (2013.01)
(58) Field of Classification Search
CPC ......... H04B 7/00; H04W 76/00; H04W 92/00
See application file for complete search history.

(56) References Cited

U.S. PATENT DOCUMENTS

| 9,698,962 B2 | 7/2017 | Rajagopalan et al. | |
| 2010/0190509 A1* | 7/2010 | Davis ................. | H04W 56/006 |
| | | | 455/456.1 |

| 2011/0103499 A1* | 5/2011 | Cheng ............... | H04W 56/0045 |
| | | | 455/517 |
| 2011/0128873 A1 | 6/2011 | Farag | |
| 2015/0208370 A1* | 7/2015 | Kim .................... | H04W 56/001 |
| | | | 370/336 |
| 2016/0357486 A1* | 12/2016 | Sonoda ................. | G06F 3/1212 |
| 2018/0367262 A1* | 12/2018 | Hwang ................. | H04L 1/1861 |
| 2019/0293773 A1* | 9/2019 | Matsushita ......... | G01S 7/52006 |

(Continued)

FOREIGN PATENT DOCUMENTS

GB          2559382 A          8/2018

OTHER PUBLICATIONS

GB Search Report from GB2302667.7 dated Aug. 29, 2023, 3 pages.
EP EESR from EP24151213.6-1206 dated Jul. 8, 2024, 12 pages.

*Primary Examiner* — Dung B Huynh
(74) *Attorney, Agent, or Firm* — Andrew L. Dunlap; Haynes Beffel & Wolfeld LLP

(57)          ABSTRACT

There is provided an apparatus and method, the apparatus comprising an antenna system to communicate with a further antenna system. The apparatus includes computation circuitry to calculate a timing advance, restricted to a predefined range, to be applied by the further antenna system, to modify a transmission time for uplink data corresponding to a sub-frame relative to a reception time for downlink data corresponding to the sub-frame at the further antenna system. The computation circuitry is configured to estimate a round trip time, when the round trip time is within the predefined range, to set the timing advance based on the round trip time, and when the round trip time is outside of the predefined range, to set the timing advance to a value within the predefined range, wherein a difference between the value and the round trip time is based on a duration of one or more sub-frames.

20 Claims, 17 Drawing Sheets

(56)          References Cited

U.S. PATENT DOCUMENTS

| | | | |
|---|---|---|---|
| 2019/0386926 A1* | 12/2019 | Abedini ............ | H04W 56/0065 |
| 2021/0194572 A1* | 6/2021 | Gu ....................... | H04W 56/006 |
| 2021/0314889 A1* | 10/2021 | Rico Alvarino .. | H04W 56/0005 |
| 2021/0360556 A1* | 11/2021 | Liu ..................... | H04W 56/005 |
| 2022/0046575 A1* | 2/2022 | Kong .................. | H04B 7/1851 |
| 2022/0217669 A1* | 7/2022 | Bai .......................... | H04W 8/24 |
| 2022/0232503 A1 | 7/2022 | Cheng et al. | |
| 2022/0330187 A1* | 10/2022 | Cheng ................ | H04W 56/004 |
| 2022/0353907 A1* | 11/2022 | Yang ................. | H04W 74/0841 |
| 2023/0027812 A1* | 1/2023 | Wang ................ | H04B 7/18513 |
| 2023/0090914 A1* | 3/2023 | Cha ........................ | H04W 24/10 |
| | | | 370/329 |
| 2023/0224843 A1* | 7/2023 | Wang ............... | H04W 56/0015 |
| | | | 370/503 |
| 2023/0239814 A1* | 7/2023 | Jung ................. | H04B 7/15528 |
| | | | 370/350 |
| 2023/0254799 A1* | 8/2023 | Zhu ........................ | H04B 7/185 |
| | | | 370/503 |
| 2023/0292273 A1* | 9/2023 | Zhang .............. | H04W 56/0045 |
| 2024/0049293 A1* | 2/2024 | Lin ................... | H04W 74/0833 |
| 2024/0073927 A1* | 2/2024 | Chen .................. | H04L 5/0053 |
| 2024/0137883 A1* | 4/2024 | Chen ................ | H04W 56/0045 |
| 2024/0205722 A1* | 6/2024 | Jiang ................ | H04W 56/0045 |
| 2024/0284453 A1* | 8/2024 | Wang ................ | H04W 56/0045 |
| 2024/0340825 A1* | 10/2024 | Wigard ............ | H04W 56/0015 |
| 2024/0381275 A1* | 11/2024 | Wigard ............... | H04B 7/1851 |
| 2025/0023806 A1* | 1/2025 | Nakata ............... | H04L 43/0864 |

* cited by examiner

FIG. 4

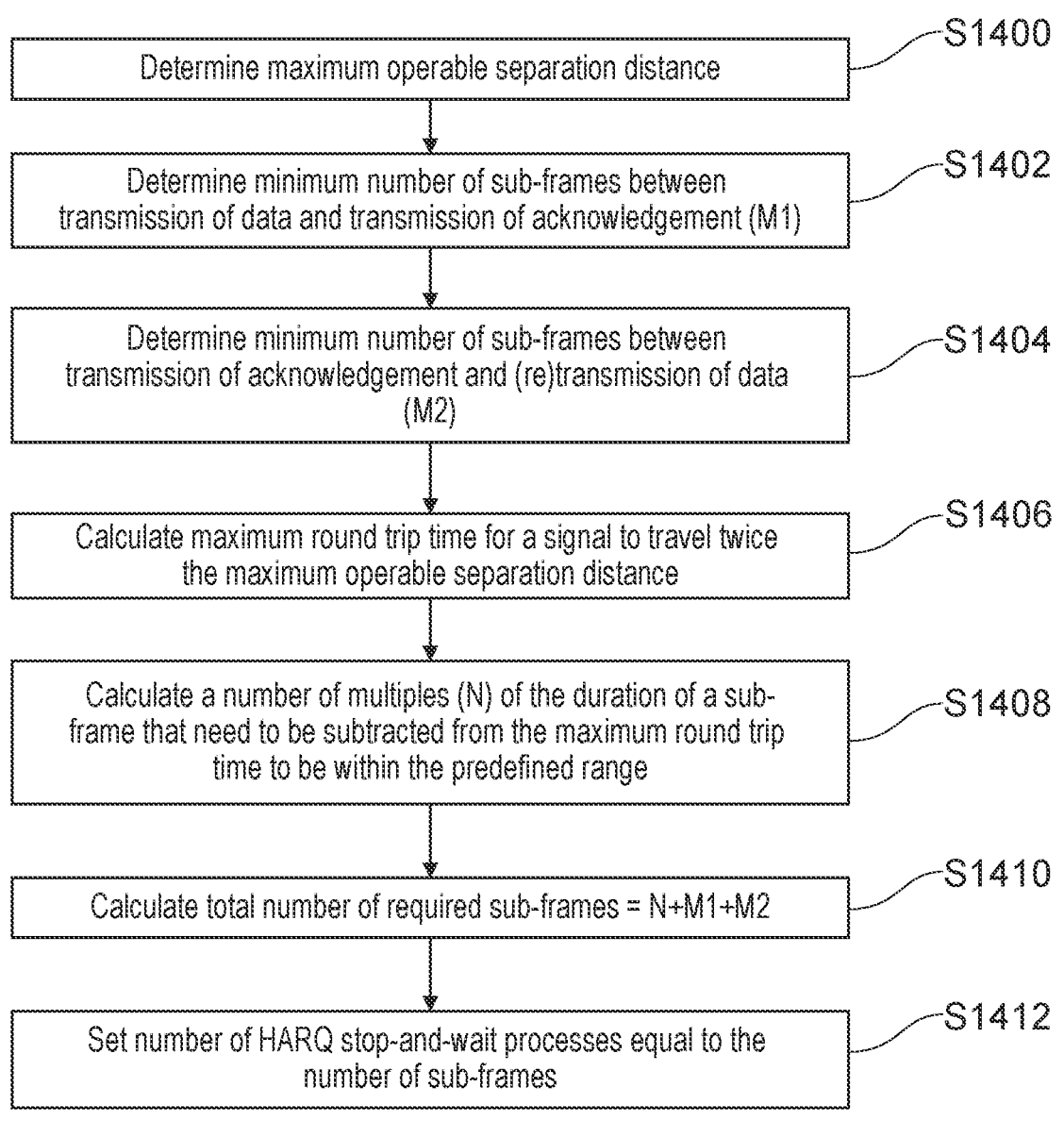

| | |
|---|---|
| Determine maximum operable separation distance | S1400 |
| Determine minimum number of sub-frames between transmission of data and transmission of acknowledgement (M1) | S1402 |
| Determine minimum number of sub-frames between transmission of acknowledgement and (re)transmission of data (M2) | S1404 |
| Calculate maximum round trip time for a signal to travel twice the maximum operable separation distance | S1406 |
| Calculate a number of multiples (N) of the duration of a sub-frame that need to be subtracted from the maximum round trip time to be within the predefined range | S1408 |
| Calculate total number of required sub-frames = N+M1+M2 | S1410 |
| Set number of HARQ stop-and-wait processes equal to the number of sub-frames | S1412 |

FIG. 14

Figure 16:
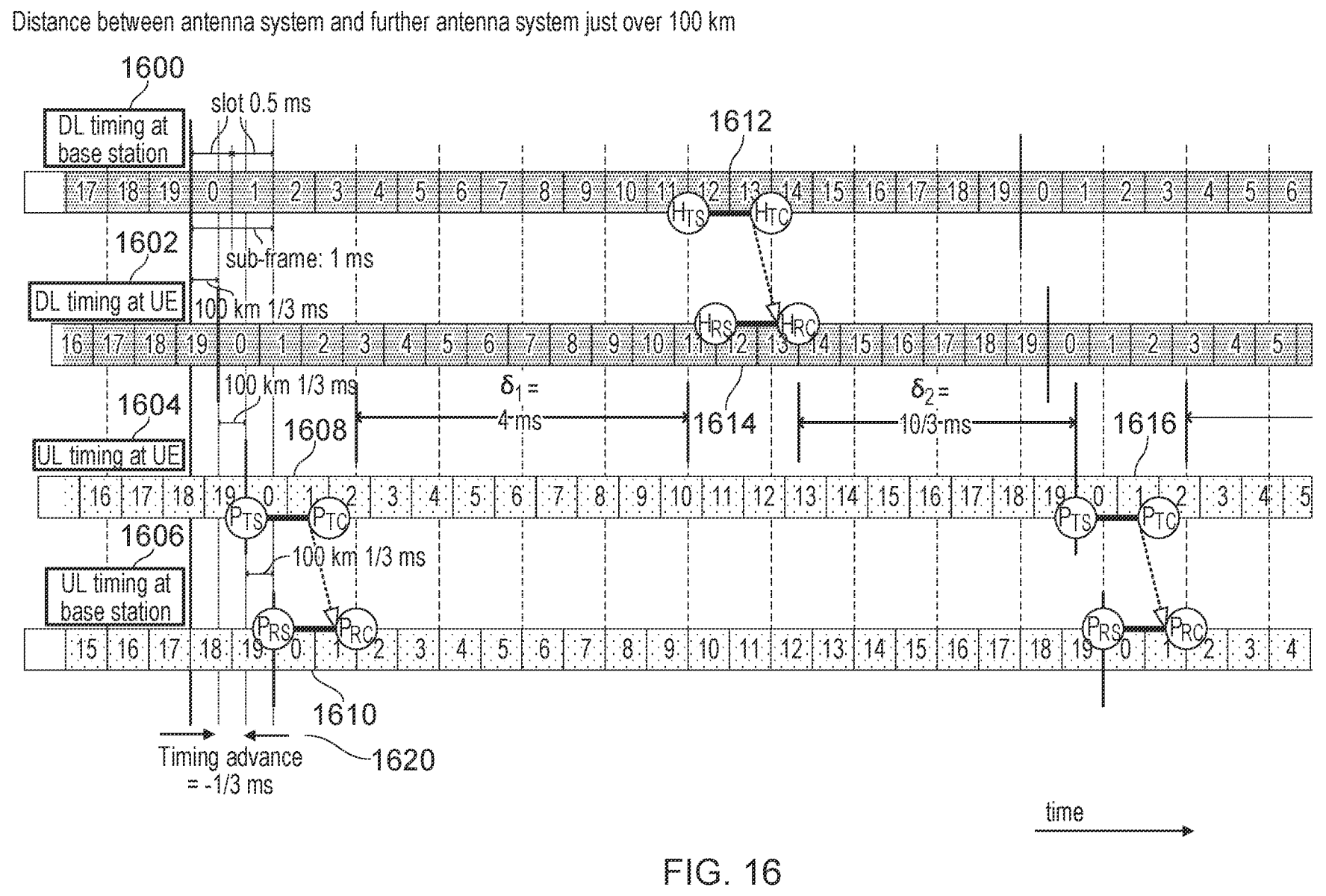

Distance between antenna system and further antenna system just over 100 km

1600

DL timing at base station slot 0.5 ms

1602

DL timing at UE sub-frame: 1 ms 100 km 1/3 ms

1612

$H_{TS}$　$H_{TC}$

1608

$\delta_1 = 4\ ms$ $H_{RS}$　$H_{RC}$

1614

100 km 1/3 ms

1604

UL timing at UE $\delta_2 = 10/3\ ms$

1616

$P_{TS}$　$P_{TC}$ $P_{TS}$　$P_{TC}$ 100 km 1/3 ms $P_{RS}$　$P_{RC}$

1610

1606

UL timing at base station $P_{RS}$　$P_{RC}$

Timing advance = -1/3 ms

1620 time

TIMING ADVANCE CALCULATION

BACKGROUND

During wireless communication, the timing of uplink transmissions and downlink transmissions between an antenna system and a further antenna system are controlled so that the uplink and downlink transmissions are received and transmitted by the antenna system and the further antenna system at predefined times. As a round trip time for a signal to travel twice a separation distance between the antenna system and the further antenna system increases, a timing advance may be applied to ensure that the uplink and downlink transmissions are received during the predefined times. However, as the round trip time increases beyond a predefined range, there are technical issues with signalling the timing advance.

SUMMARY

According to some example configurations there is provided an apparatus comprising:

an antenna system configured to communicate with a further antenna system of a wireless communication system during a transmission frame identifying a plurality of sub-frames;

computation circuitry configured to calculate a timing advance to be applied, by the further antenna system, to modify a time at which uplink data corresponding to a particular sub-frame of the plurality of sub-frames is transmitted by the further antenna system relative to a time at which downlink data corresponding to the particular sub-frame would be received by the further antenna system; and communication circuitry configured to transmit the timing advance to the further antenna system, wherein the timing advance is restricted to a predefined range, and the computation circuitry is configured:

to estimate a round trip time for a signal to travel twice a separation distance between the antenna system and the further antenna system;

in response to the round trip time being within the predefined range, to set the timing advance based on the round trip time; and in response to the round trip time being outside of the predefined range, to set the timing advance to a value within the predefined range, wherein a difference between the value and the round trip time is based on a duration of one or more sub-frames.

According to some example configurations there is provided a wireless communication system comprising:

a further antenna system configured to communicate with an antenna system;

communication circuitry configured to control the further antenna system to communicate with the antenna system during a transmission frame identifying a plurality of sub-frames; and control circuitry responsive to reception, from the antenna system, of information identifying a timing advance, to control the further antenna system to apply the timing advance to modify a time at which uplink data corresponding to a particular sub-frame of the plurality of sub-frames is transmitted by the further antenna system relative to a time at which downlink data corresponding to the particular sub-frame would be received by the further antenna system, wherein the timing advance is restricted to a predefined range, and the timing advance is calculated by computation circuitry of the antenna system that is configured:

to estimate a round trip time for a signal to travel twice a separation distance between the antenna system and the further antenna system;

in response to the round trip time being within the predefined range, to set the timing advance based on the round trip time; and in response to the round trip time being outside of the predefined range, to set the timing advance to a value within the predefined range, wherein a difference between the value and the round trip time is based on a duration of one or more sub-frames.

According to some example configurations there is provided a method of operating an apparatus comprising an antenna system configured to communicate with a further antenna system of a wireless communication system during a transmission frame identifying a plurality of sub-frames, wherein the method comprises:

calculating a timing advance to be applied, by the further antenna system, to modify a time at which uplink data corresponding to a particular sub-frame of the plurality of sub-frames is transmitted by the further antenna system relative to a time at which downlink data corresponding to the particular sub-frame would be received by the further antenna system, wherein the timing advance is restricted to a predefined range;

transmitting the timing advance to the further antenna system;

estimating a round trip time for a signal to travel twice a separation distance between the antenna system and the further antenna system;

in response to the round trip time being within the predefined range, setting the timing advance based on the round trip time; and in response to the round trip time being outside of the predefined range, setting the timing advance to a value within the predefined range, wherein a difference between the value and the round trip time is based on a duration of one or more sub-frames.

According to some example configurations there is provided a method of operating a wireless communication system comprising a further antenna system configured to communicate with an antenna system, the method comprising:

controlling the further antenna system to communicate with the antenna system during a transmission frame identifying a plurality of sub-frames; and in response to reception, from the antenna system, of information identifying a timing advance, controlling the further antenna system to apply the timing advance to modify a time at which uplink data corresponding to a particular sub-frame of the plurality of sub-frames is transmitted by the further antenna system relative to a time at which downlink data corresponding to the particular sub-frame would be received by the further antenna system, wherein the timing advance is restricted to a predefined range, and the timing advance is calculated, at the antenna system by:

estimating a round trip time for a signal to travel twice a separation distance between the antenna system and the further antenna system;

in response to the round trip time being within the predefined range, setting the timing advance based on the round trip time; and in response to the round trip time being outside of the predefined range, setting the timing advance to a value within the predefined range, wherein a difference between the value and the round trip time is based on a duration of one or more sub-frames.

BRIEF DESCRIPTION OF THE FIGURES

The present techniques will be described further, by way of example only, with reference to configurations thereof as illustrated in the accompanying drawings, in which:

FIG. 4 schematically illustrates timing diagrams relating to the transmission of frames between an apparatus and a wireless communication system in accordance with some configurations of the present techniques;

FIG. 14 schematically illustrates a process of determining a number of sub-frames for a maximum round trip time in accordance with some configurations of the present techniques;

FIG. 16 schematically illustrates timing diagrams relating to the transmission of frames between an apparatus and a wireless communication system in accordance with some configurations of the present techniques; and FIG. 17 schematically illustrates timing diagrams relating to the transmission of frames between an apparatus and a wireless communication system in accordance with some configurations of the present techniques.

DETAILED DESCRIPTION

Figure 1:
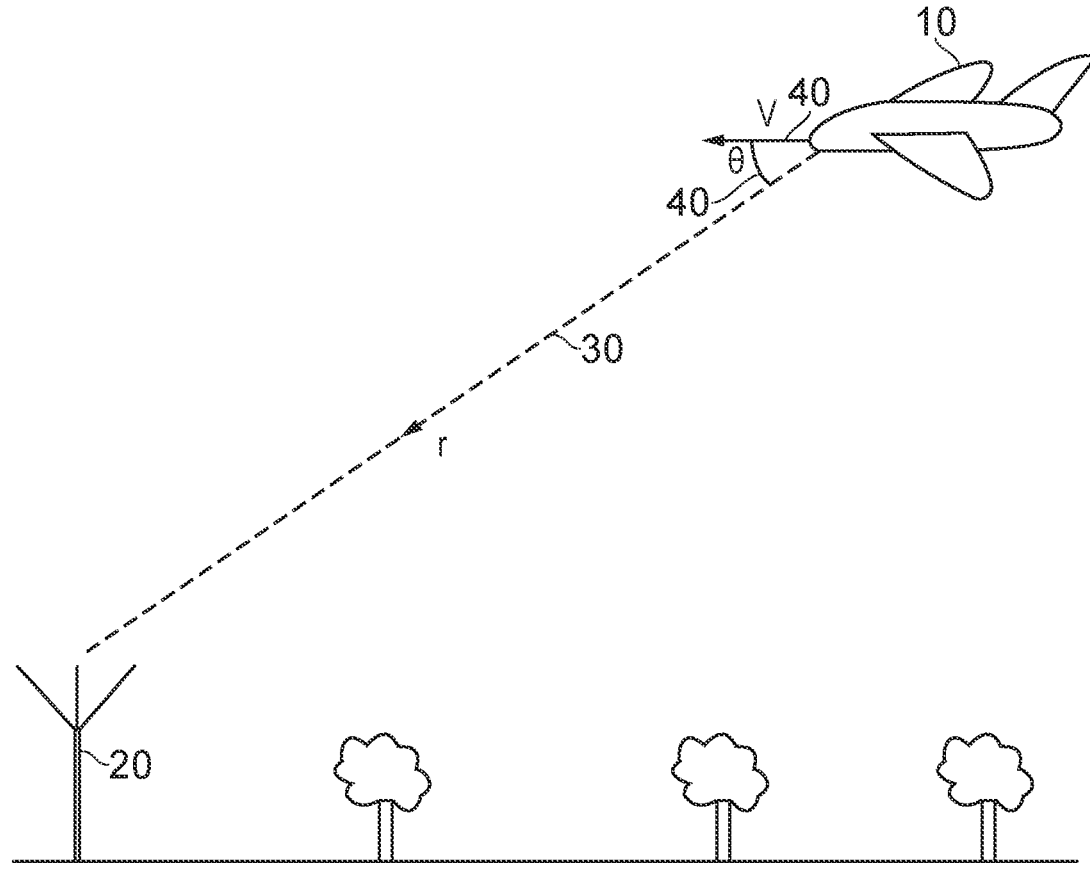
FIG. 1 schematically illustrates an apparatus and a wireless communication system in accordance with some configurations of the present techniques.

Communication between an antenna system (for example, a base station) and a further antenna system (for example, user equipment) comprises transmission of uplink data from the further antenna system to the antenna system and transmission of downlink data from the antenna system to the further antenna system. In such a system, the antenna system is aware of a time at which the uplink data (for example, uplink payload data or an uplink acknowledgement signal indicating correct/incorrect receipt of downlink payload data) is expected to be received with reference to a time at which the antenna system is transmitting downlink data (for example, downlink payload data or a downlink acknowledgement signal indicating correct/incorrect receipt of uplink payload data).

Where the separation distance between the antenna system and the further antenna system is negligible (for example zero or sufficiently small that the transmission time is small relative to the time allocated for transmission), the further antenna system is able to determine the time at which uplink data is transmitted based on the time at which downlink data is received. However, where the separation distance between the antenna system and the further antenna system becomes non-negligible (for example, where the transmission time becomes comparable to the time allocated for transmission), this approach results in uplink data arriving at the antenna system outside of (or partially outside of) a timing window in which the uplink data is expected to be received.

For example, if the distance between the antenna system and the further antenna system is such that the time taken for a downlink transmission to travel from the antenna system to the further antenna system is equal to half the time allocated for a subsequent uplink transmission, then the further antenna system will adjust its timing to the reception time of the downlink signal and, as such, will be out of sync with the antenna system by half of the time allocated for the subsequent uplink transmission. As a result, the uplink transmission will be transmitted from the further antenna system starting at a time that is delayed by a time that is equal to half of the time allocated for the uplink transmission. The uplink transmission will then have to travel the distance between the further antenna system and the antenna system and will arrive at the antenna system with an additional delay that is equal to half of the time allocated for the uplink transmission. As a result, the uplink data arrives at the end of the time allocated for transmission and, as a further result, may be discarded by the antenna system.

To this end, communication systems provide the means for the antenna system to instruct the further antenna system to apply a timing advance to uplink data transmitted from the further antenna system to the antenna system. In the above example, an appropriate timing advance could be equal to the time allocated for transmission or to the round trip time for a signal to travel twice the distance between the antenna system and the further antenna system. Typically, such timing advances are restricted to a predefined range, which, for example, may relate to restrictions in the particular method that is used to signal the timing advance or that may relate to requirements to reduce the size of control data sent between the antenna system and the further antenna system.

In some configurations there is provided an apparatus (e.g., a base station) comprising an antenna system configured to communicate with a further antenna system of a wireless communication system (e.g., user equipment) during a transmission frame identifying a plurality of sub-frames. The apparatus is also provided with computation circuitry configured to calculate a timing advance to be applied, by the further antenna system, to modify a time at which uplink data corresponding to a particular sub-frame of the plurality of sub-frames is transmitted by the further antenna system relative to a time at which downlink data corresponding to the particular sub-frame would be received by the further antenna system. The communication circuitry is configured to transmit the timing advance to the further antenna system and the timing advance is restricted to a predefined range. The computation circuitry is configured, in order to determine the timing advance, to estimate a round trip time for a signal to travel twice a separation distance between the antenna system and the further antenna system. In response to the round trip time being within the predefined range, the computation circuitry is configured to set the timing advance based on the round trip time. In response to the round trip time being outside of the predefined range, the computation circuitry is configured to set the timing advance to a value within the predefined range, wherein a difference between the value and the round trip time is based on a duration of one or more sub-frames.

The communication between the antenna system and the further antenna system is defined as occurring within a transmission frame. The communication may be performed using a time division duplex (TDD) scheme or a frequency division duplex (FDD) scheme. In either case, the transmission frame is composed of a plurality of sub-frames, which are used to synchronise the timing between the antenna system and the further antenna system.

The synchronisation is based on the computation of a timing advance, which is based on a distance between the antenna system and the further antenna system. Such a distance may be calculated in a variety of different ways. In some configurations, the locations of one or more of the antenna system and the further antenna system may be known. For example, the locations may be fixed and recorded in storage circuitry comprised in the apparatus. Alternatively, the location of one or more of the antenna system and the further antenna system may be variable, i.e., the antenna system and/or the further antenna system may be a moving system either comprised within a moving vehicle or portable such that it can be moved, for example, by a user. In such configurations, the location of one or more of the antenna system and the further antenna system may change over time and may be determined from positioning circuitry, e.g. using one or more GPS receivers (for example, connected to the GPS, GALILEO and/or GLONAS networks) located at the antenna system and/or the further antenna system and the locations may be shared between the antenna system and the further antenna system via uplink or downlink data. Alternatively, the position of the moving system may be predictable, for example, the position of the antenna system and/or the further antenna system may be comprised within one or more databases accessible to the apparatus that define a route to be taken by the antenna system and/or the further antenna system.

Based on the locations of the antenna system and the further antenna system, the calculation circuitry can estimate (calculate) a round trip time as a time taken for the signal to travel twice the distance between the antenna system and the further antenna system. For example, the calculation circuitry could divide the distance between the antenna system and the further antenna system by half the average speed at which the transmission is propagating. In some configurations, the round trip time is calculated by measuring the time delay between the reception of a non-time advanced signal originating from the further antennas system and an indication of opportunity from the antenna system to instruct the further antenna system to transmit its non-time advanced signal. Typically such a signal is transmitted during initial access when the further antenna system seeks to connect to the network, and the antenna system establishes an absolute distance between the antenna system and the further antenna system. Once a link is established, to maintain the link, the antenna system will continuously monitor the relative delay of the UL signal, which at this point is subject to timing advance, and adjust the time advance accordingly to ensure UL synchronisation. Due to constraints on the manner in which the timing advance is signalled (for example, due to a specific transmission format or requirement), the timing advance is restricted to within a predefined range. This limitation restricts the separation distance between the antenna system and the further antenna system that can be compensated for using this mechanism. The inventors have realised that this limitation does not have to place a limit on the overall separation distance over which the antenna system and the further antenna system can communicate. In particular, the inventors have realised that if the uplink transmission is received in a known sub-frame of the transmission frame, communication can be successfully performed even if the known sub-frame in which the uplink transmission is received is not the same as the sub-frame in which the uplink transmission was transmitted. To this end, the communication circuitry is configured, when the round trip time is greater than a duration of one or more sub-frames, to set the timing advance to a value within the predefined range where the value that is chosen within the predefined range is selected such that a difference between the round trip time and the value is based on (for example, is equal to or approximately equal to), a duration of one or more (an integer number of) sub-frames of the transmission frame. As a result, when the round trip time is greater than the duration of a sub-frame, the uplink transmission may be transmitted, with a timing advance restricted to the predefined range, during an $N^{th}$ sub-frame of the transmission frame as perceived by the further antenna system and may be received in an $(N+K)^{th}$ sub-frame of the transmission frame as perceived by the antenna system. Using this approach the overall distance over which the antenna system can communicate with the further antenna system is increased beyond a distance that can be compensated for using a timing advance that is defined within the predefined range.

The uplink data and downlink data can be variously defined. However, in some configurations the communication circuitry is configured to receive an uplink communication transmitted from the further antenna system during a first predefined sub-frame of the plurality of sub-frames advanced by the timing advance and to transmit information indicative of receipt of the uplink communication during a second predefined sub-frame of the plurality of sub-frames. In such configurations, the uplink communication is uplink data comprising uplink payload data (either as an initial transmission of payload data or as a retransmission of payload data due to receipt of a negative acknowledgement indicating an incorrect or incomplete previous attempt to transmit the payload data). The transmitted information indicative of receipt of the uplink communication is downlink data specifying whether the uplink transmission has been correctly received and decoded (an ACK signal) or whether the uplink transmission has not been correctly received and/or has not been correctly decoded (a NACK signal).

In some configurations an acknowledgement delay between the first predefined sub-frame and the second predefined sub-frame is set based on a maximum operable separation distance between the antenna system and the further antenna system. At very large separation distances, for example, separation distances with a round trip time of several sub-frames the received uplink communication may be received by the antenna system in a sub-frame that is several sub-frames later than the sub-frame that the further antenna system transmitted the sub-frame. As a result, the apparatus may require a longer acknowledgement delay between the first predefined sub-frame and the second predefined sub-frame in order to ensure that sufficient time is allowed for processing the uplink communication.

The acknowledgement delay can be set equal to any number of sub-frames. However, in some configurations, the acknowledgement delay is equal to a predefined minimum number of sub-frames plus at least one additional sub-frame for each of the one or more sub-frames on which the duration is based. The predefined minimum number of sub-frames may correspond to a minimum amount of processing time that the apparatus requires to process the uplink transmission. In some configurations, the predefined minimum number of sub-frames is equal to an integer number of sub-frames that are required in order for a minimum processing time to pass. For example, if each sub-frame takes 1 ms and a minimum amount of processing time required by the apparatus is 3.5 ms, then the predefined minimum number of sub-frames would be 4 sub-frames to allow for the predefined minimum processing time. It would be readily apparent to the skilled person that these numbers are provided for exemplary purpose only and that any sub-frame time and any minimum processing time could be considered. At a distance of 0 km, the apparatus will have the predefined minimum number of sub-frames to process the uplink communication even if no additional sub-frames are included. However, as the distance between the antenna system and the further antenna system is increased, the sub-frame in which the uplink communication is received will approach the second predefined sub-frame. The at least one additional sub-frame therefore ensures that there is sufficient time between the sub-frame in which the uplink communication is received and the second predefined sub-frame.

In some configurations, a total number of sub-frames in the transmission frame is determined based on the acknowledgement delay and a retransmission delay defined as a default number of sub-frames between the second predefined sub-frame and a next first predefined sub-frame. The transmission frame includes time for the uplink communication to be received and processed before a downlink communication (e.g., downlink payload data or an ACK/NACK indicating whether the uplink communication was successfully received). In addition, the transmission frame includes time for the downlink communication to be received and processed before an uplink communication (e.g., a transmission or a retransmission in response to the ACK/NACK, or a transmission of an ACK/NACK indicating that downlink payload data as part of a downlink communication has been received). Therefore, the transmission frame comprises a retransmission delay (defined in terms of sub-frames each having a fixed duration, e.g., 1 ms) to ensure that sufficient time is provided for such processing.

In some configurations the acknowledgement delay comprises a processing time associated with decoding the uplink communication; and the retransmission delay comprises a processing time associated with decoding the downlink communication. The transmission frame may be defined as equal to the acknowledgement delay (in terms of sub-frames) added to the retransmission delay (in terms of sub-frames). In alternative configurations, one or more additional sub-frames may be added to the transmission frame, for example, to provide sufficient time to perform other communication functions.

The maximum round trip time can be defined based on various parameters of the communication system. In some configurations a maximum round trip time for a signal to travel twice the maximum operable distance is greater than the predefined range. For example, the predefined range may define a maximum predefined time and a minimum predefined time wherein a time difference between the maximum predefined time and the minimum predefined time is greater than or equal to a sub-frame duration time of a single sub-frame. However, the maximum round trip time may be greater than this duration and may be equal to a plurality of sub-frame durations.

In addition to receiving uplink communications, in some configurations the communication circuitry is configured to transmit a downlink communication to the further antenna system during a third predefined sub-frame of the plurality of sub-frames and to receive information indicative receipt of the downlink communication transmitted from the further antenna system during a fourth predefined sub-frame of the plurality of sub-frames advanced by the timing advance. In such configurations, the downlink communication is downlink data comprising downlink payload data (either as an initial transmission of payload data or as a retransmission of payload data due to receipt of a negative acknowledgement indicating an incorrect or incomplete previous attempt to transmit the payload data). The transmitted information indicative of receipt of the downlink communication is uplink data specifying whether the downlink transmission has been correctly received and decoded (an ACK signal) or whether the downlink transmission has not been correctly received and/or has not been correctly decoded (a NACK signal).

The relationship between the third and fourth predefined sub-frames may be variously defined. However, in some configurations the third predefined sub-frame and the fourth predefined sub-frame are separated by a same number of sub-frames as the first predefined sub-frame and the second predefined sub-frame. In general each transmission frame is one of a plurality of sequential transmission frames such that data is receive and either acknowledged of negatively acknowledged by the receiving one of the antenna system and the further antenna system. As a result, the number of sub-frames that occur between the first predefined sub-frame and second predefined sub-frame may be different to a number of sub-frames occurring between the predefined second sub-frame and the first predefined sub-frame. Therefore, in some configurations, the number of sub-frames between the third predefined sub-frame and a sequentially next fourth predefined sub-frame may be equal to the number of sub-frames between the first predefined sub-frame and a sequentially next second predefined sub-frame. Alternatively, in some configurations, the number of sub-frames between the third predefined sub-frame and a sequentially next fourth predefined sub-frame may be equal to the number of sub-frames between the second pre-defined sub-frame and a sequentially next first predefined sub-frame.

There are different ways in which the round trip time can be calculated. In some configurations, in response to the round trip time being outside of the predefined range, the computation circuitry is configured to determine the value by subtracting the duration of one or more sub-frames from the round trip time. Alternatively, in some configurations, the computation circuitry is configured to determine the value by calculating the value of X mod Y where X is the round trip time, Y is the duration of a single sub-frame, and "mod" indicates the modulo operator indicating that the result of X mod Y is the remainder of X divided by Y. In some configurations, the value is determined by performing a lookup of the round trip time in a look up table storing information identifying the value of the timing advance as a function of the round trip time.

The antenna system and the further antenna system can communicate using any communication standard. However, in some configurations the antenna system and the further antenna system are configured to communicate according to a HARQ (Hybrid Automatic Repeat request) process. HARQ uses a combination of forward error correction and automatic repeat request error-control. During data transmission of payload data by a transmitting one of the antenna system and/or the further antenna system, one or more additional bits are added to the payload data for the purpose of error checking and/or error correcting such that the receiving one of antenna system and/or the further antenna system is able to determine whether at least a portion of the received message has been received and decoded correctly and, in the event that the received message has not been received correctly, the one or more additional bits may be used, for some types of transmission errors, to correct errors in the transmission.

Once the received data has been decoded and correctable errors have been corrected the receiving one of the antenna system and/or the further antenna system transmits an acknowledgement (ACK) or a negative acknowledgement (NACK) message to signal whether the payload data has been received and decoded correctly or whether a portion of the payload data has not be received and decoded correctly. In the event of a negative acknowledgement, the transmitting one of the antenna system and the further antenna system is able to retransmit at least the portion of the payload data that has not been received and decoded correctly. The apparatus, wireless communication circuitry and methods described herein provide the means for performing HARQ transmissions and retransmissions over longer ranges.

In some configurations the antenna system and the further antenna system are configured to communicate using a plurality of stop-and-wait HARQ processes. The plurality of stop-and-wait HARQ processes occur in parallel to ensure that at least one of the stop-and-wait HARQ processes is transmitting at a given time. This approach increases the throughput of the communication system. In some configuration a total number of the plurality of stop-and-wait HARQ processes is equal to a total number of sub-frames in the transmission frame.

The predefined range may be set as a parameter of the system or to ensure that the amount of control information transmitted is minimised in order to increase the available bandwidth for data transmission. In some configurations the predefined range is determined based on a wireless communication standard. The wireless communication standard may be a 4G communication standard or a 5G communication standard. The techniques disclosed herein may be used to increase the maximum separation distance over which the antenna system and the further antenna system may communicate using the aforementioned communication standards beyond the predefined ranges specified therein.

The predefined range can be variously defined and may define a range from zero to the timing advance associated with a maximum separation distance supported by a particular communication standard. In some configurations the predefined range is between a minimum time advance and a maximum time advance, and the minimum time advance is a negative time advance. The negative timing advance corresponds to a timing delay. Providing a timing advance that can take positive or negative values provides increased flexibility in synchronising the antenna system with the further antenna system.

In some configurations there is provided a wireless communication system (e.g., user equipment) comprising a further antenna system configured to communicate with an antenna system (e.g., base station). The wireless communication system is also provided with communication circuitry configured to control the further antenna system to communicate with the antenna system during a transmission frame identifying a plurality of sub-frames. In addition, the wireless communication system is provided with control circuitry responsive to reception, from the antenna system, of information identifying a timing advance, to control the further antenna system to apply the timing advance to modify a time at which uplink data corresponding to a particular sub-frame of the plurality of sub-frames is transmitted by the further antenna system relative to a time at which downlink data corresponding to the particular sub-frame would be received by the further antenna system. The timing advance is restricted to a predefined range, and the timing advance is calculated by computation circuitry of the antenna system. The computation circuitry of the antenna system is configured to estimate a round trip time for a signal to travel twice a separation distance between the antenna system and the further antenna system. The computation circuitry is responsive to the round trip time being within the predefined range, to set the timing advance based on the round trip time. In addition, the computation circuitry is responsive to the round trip time being outside of the predefined range, to set the timing advance to a value within the predefined range, wherein a difference between the value and the round trip time is based on a duration of one or more sub-frames.

The wireless communication system may be provided as a standalone unit that is configured to interact with one or more apparatuses (e.g., base stations) as described hereinabove. Alternatively, the wireless communication system may be provided as part of a system with one or more apparatuses (e.g., base stations) and, in some configurations, one or more further wireless communication systems. As discussed, the wireless communication system is arranged to receive and apply the timing advance that was calculated by the apparatus. The wireless communication system has no knowledge of when (i.e., in which sub-frame of the transmission frame) the apparatus receives uplink transmissions. In this sense, the wireless communication system also is not required to have knowledge of the separation distance between the antenna system and the further antenna system. As a result, the wireless communication system is able to implement the timing advance and to realise communication over a maximum distance that is much greater than a maximum transmission distance corresponding to the predefined range.

In some configurations the communication circuitry is configured to transmit an uplink communication to the antenna system during a first predefined sub-frame of the plurality of sub-frames advanced by the timing advance and to receive information indicative of receipt of the uplink communication from the antenna system during a second predefined sub-frame of the plurality of sub-frames. In such configurations, the uplink communication is uplink data comprising uplink payload data (either as an initial transmission of payload data or as a retransmission of payload data due to receipt of a negative acknowledgement indicating an incorrect or incomplete previous attempt to transmit the payload data). The transmitted information indicative of receipt of the uplink communication is downlink data specifying whether the uplink transmission has been correctly received and decoded (an ACK signal) or whether the uplink transmission has not been correctly received and/or has not been correctly decoded (a NACK signal).

In some configurations the communication circuitry is configured to receive a downlink communication from the antenna system during a third predefined sub-frame of the plurality of sub-frames advanced by the timing advance and to transmit information indicative receipt of the downlink communication transmitted from the antenna system during a fourth predefined sub-frame of the plurality of sub-frames. In such configurations, the downlink communication is downlink data comprising downlink payload data (either as an initial transmission of payload data or as a retransmission of payload data due to receipt of a negative acknowledgement indicating an incorrect or incomplete previous attempt to transmit the payload data). The transmitted information indicative of receipt of the downlink communication is uplink data specifying whether the downlink transmission has been correctly received and decoded (an ACK signal) or whether the downlink transmission has not been correctly received and/or has not been correctly decoded (a NACK signal).

In some configurations the wireless communication system is mounted on a moving vehicle. In some configurations, the moving vehicle could be a train with the apparatus corresponding to one of a plurality of base stations located alongside a train track. The moving vehicle is an aircraft. In such configurations, the apparatus corresponding to one of a plurality of base stations located on the ground.

Particular configurations of the invention will now be described with references to the attached figures.

The wireless communication circuitry for which the techniques described herein can be utilised can take a variety of forms. For instance, the techniques could be applied in respect of trains, where the ground terminals may be spread out along the track. However, for the purposes of the examples discussed herein, it will be assumed that the wireless communication circuitry is a moving vehicle in the form of an aircraft, such as the airplane 10 shown in FIG. 1. As shown in FIG. 1, the airplane 10 is able to communicate with a ground terminal 20 (which may also be referred to herein as a base station of a ground station). A network of ground terminals may be provided, enabling the aircraft 10 to connect to different ground terminals during a flight in order to seek to maintain a communication link that can be used to provide connectivity to passengers in the aircraft. As shown in FIG. 1, the aircraft 10 is assumed to be travelling at a velocity 40, and has a relative separation 30 between it and the ground terminal to which it is connected. This relative separation can be specified as a vector, as can the velocity 40, and there will be an angular separation between the velocity vector and the relative separation vector, namely the angle 50 shown in FIG. 1.

Figure 2:
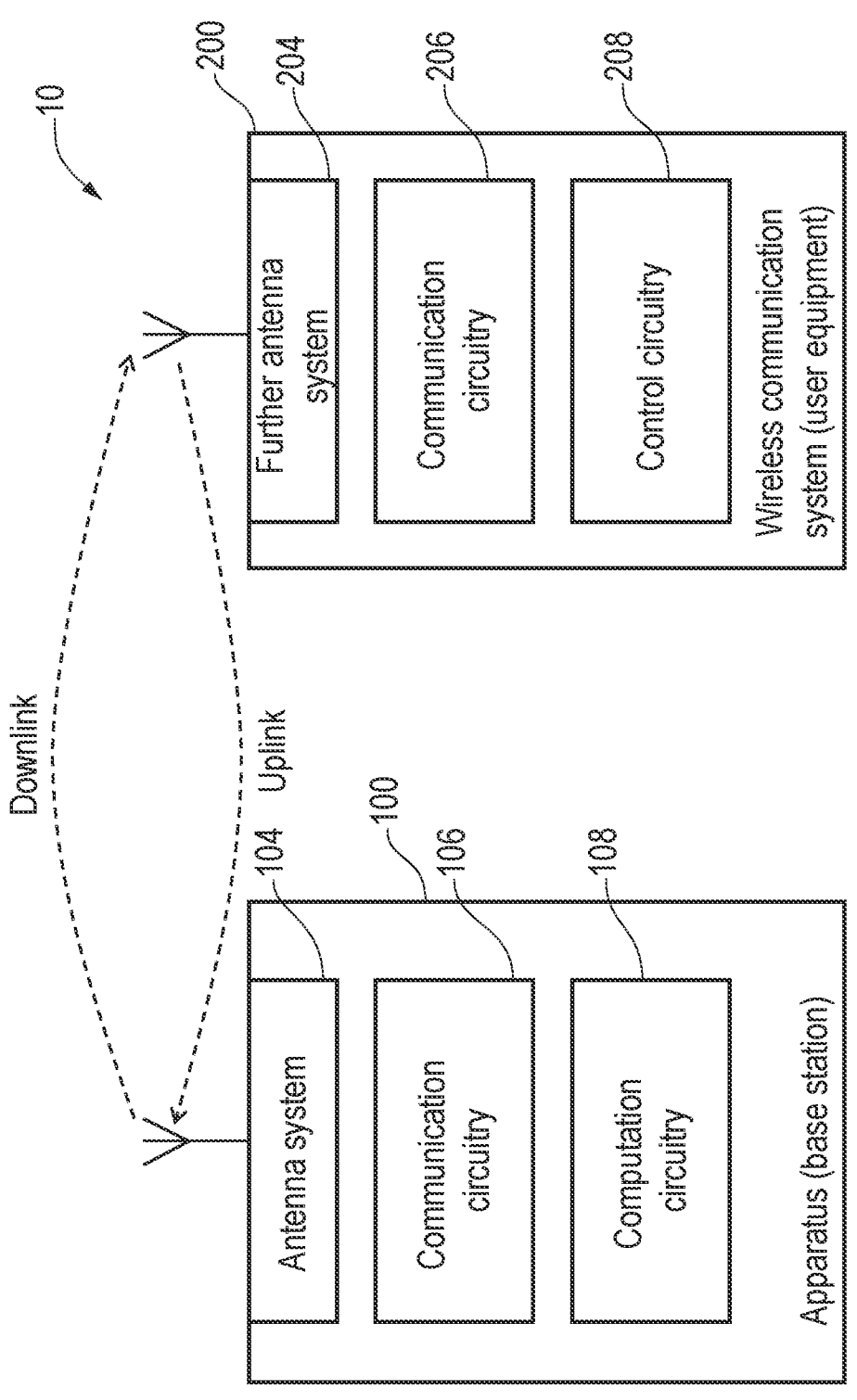
FIG. 2 schematically illustrates an apparatus and a wireless communication system in accordance with some configurations of the present techniques.

FIG. 2 schematically illustrates a system 10 comprising an apparatus (base station) 100 and a wireless communication system (user equipment) 200 according to various configurations of the present techniques. The apparatus 100 and the wireless communication system 200 are arranged to communicate with one another via wireless communication. The wireless communication system 200 is arranged to transmit uplink transmissions to the apparatus 100 and to receive downlink transmissions from the apparatus 100. Whilst only one apparatus 100 and one wireless communication system 200 are illustrated, the system 10 may comprise any number of apparatuses such as the apparatus 100 and any number of wireless communication systems such as the wireless communication system 200.

The apparatus 100 is provided with an antenna system 104, communication circuitry 106 and computation circuitry 108. The antenna system 104 is arranged to communicate with a further antenna system 204 of the wireless communication system 200 during a transmission frame identifying a plurality of sub-frames. The antenna system 104 may be a directional antenna arranged to communicate using beamforming to transmit and receive in a specific (configurable) direction. Alternatively, the antenna system 104 may be an omni-directional antenna arranged to communicate in all directions. The computation circuitry 108 is arranged to calculate a timing advance that is to be applied by the wireless communication system 200 when transmitting uplink communications to the apparatus 100 to modify a time at which uplink data corresponding to a particular sub-frame of the plurality of sub-frames is transmitted by the further antenna 204 system relative to a time at which downlink data corresponding to the particular sub-frame would be received by the further antenna system 204. The communication circuitry 106 is arranged to control the antenna system 104 to transmit the timing advance that is calculated by the computation circuitry 108 to the further antenna system 204.

The wireless communication circuitry 200 comprises a further antenna system 204, communication circuitry 206 and control circuitry 208. The further antenna system 104 is arranged to communicate, via wireless communication, with the antenna system 104 of the apparatus. The further antenna system 204 may be an omnidirectional antenna system of a directed antenna system arranged to transmit and receive communications in a particular (configurable) direction using beam forming. The communication circuitry 206 is arranged to control the further antenna system 204 to perform communication with the antenna system 104 of the apparatus 100. The control circuitry 208 is responsive to the further antenna system 204 receiving, from the antenna system 104, information identifying a timing advance to be applied by the wireless communication system 200 to adjust a time at which uplink data corresponding to a particular sub-frame of the plurality of sub-frames is transmitted by the further antenna system relative to a time at which downlink data corresponding to the particular sub-frame would be received by the further antenna system 204.

Figure 3:
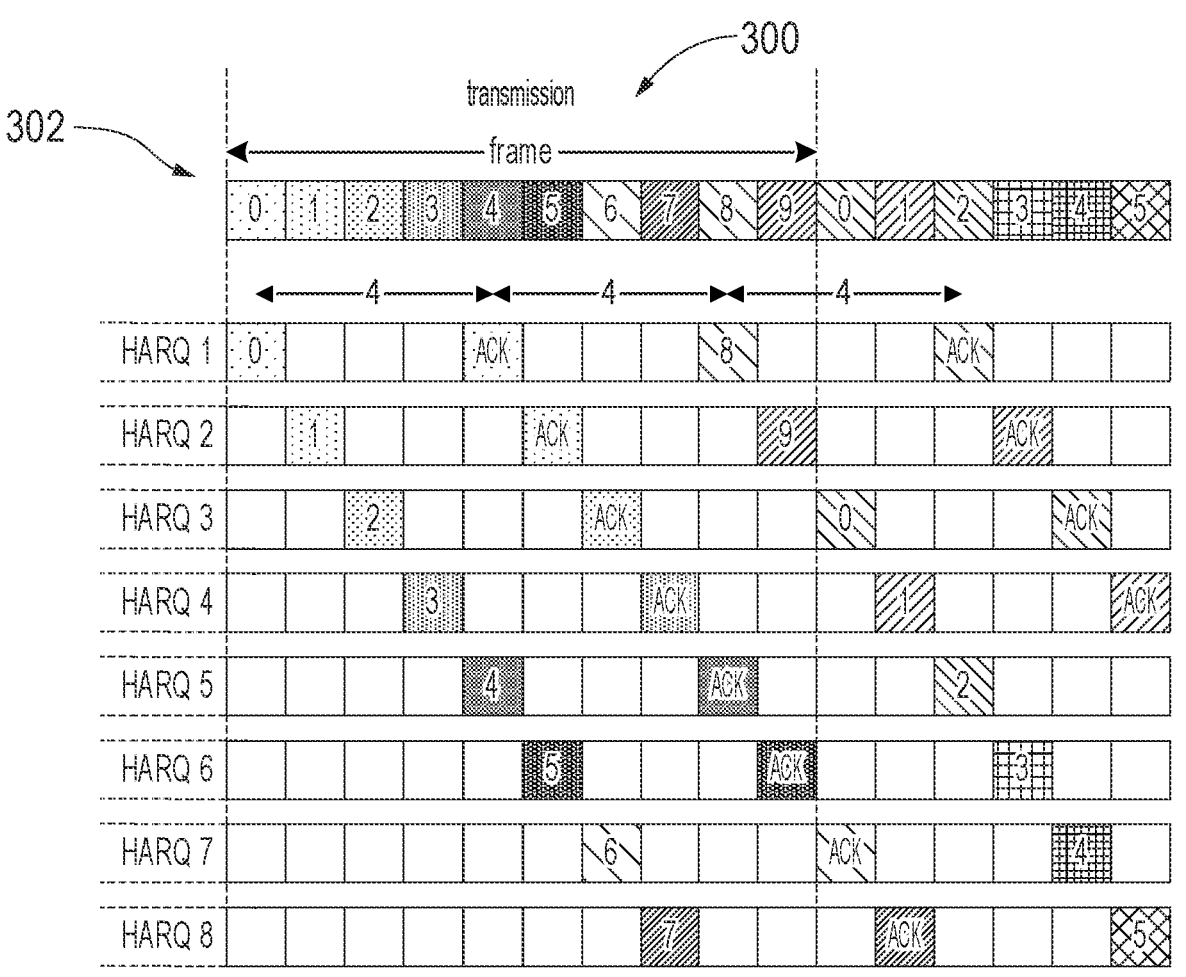
FIG. 3 schematically illustrates a sequence of HARQ stop-and-wait processes in accordance with some configurations of the present techniques.

FIG. 3 schematically illustrates the allocation of sub-frames of a transmission frame 300 to a plurality of HARQ stop-and-wait processes. The transmission frame 300 comprises a plurality of sub-frames, for example, sub-frame 302. In the illustrated configuration, the transmission frame 300 comprises 10 sub-frames labelled 0 to 9. Transmission during the transmission frame 300 is distributed between a plurality of HARQ stop-and-wait processes (HARQ 1 through to HARQ 8). Each of the HARQ stop-and-wait processes comprises a transmission sub-frame in which payload data is transmitted and an acknowledgement/negative-acknowledgement sub-frame (ACK) for receiving an acknowledgement or a negative acknowledgement of receipt of the payload data transmitted in the transmission sub-frame. For example, HARQ stop-and-wait process HARQ 1 has a transmission frame scheduled in sub-frame zero of the transmission frame 300 and an ACK sub-frame for receiving an acknowledgement or a negative acknowledgement of receipt of the transmitted data in sub-frame four of the transmission frame 300. In the illustrated configuration, the delay between the beginning of the transmission sub-frame and the beginning of the ACK sub-frame is 4 sub-frames. Similarly, the delay between the start of the ACK sub-frame and the next transmission sub-frame is 4 sub-frames. As a result, the HARQ stop-and-wait process HARQ 1 performs the steps of transmission, wait, receipt of an acknowledgement or negative acknowledgement, and waiting over a cycle of 8 sub-frames. As a result, the next cycle of the HARQ 1 stop-and-wait process may be offset, in terms of the sub-frames used for transmission and reception, in the next transmission frame. Each of the eight HARQ stop-and-wait processes is offset with respect to the preceding HARQ stop-and-wait process by a single sub-frame such that in any given sub-frame of the transmission frame 300, there is one HARQ stop-and-wait process that is transmitting and one HARQ stop-and-wait process that expects to receive an acknowledgement or negative acknowledgement signal.

Figure 4:
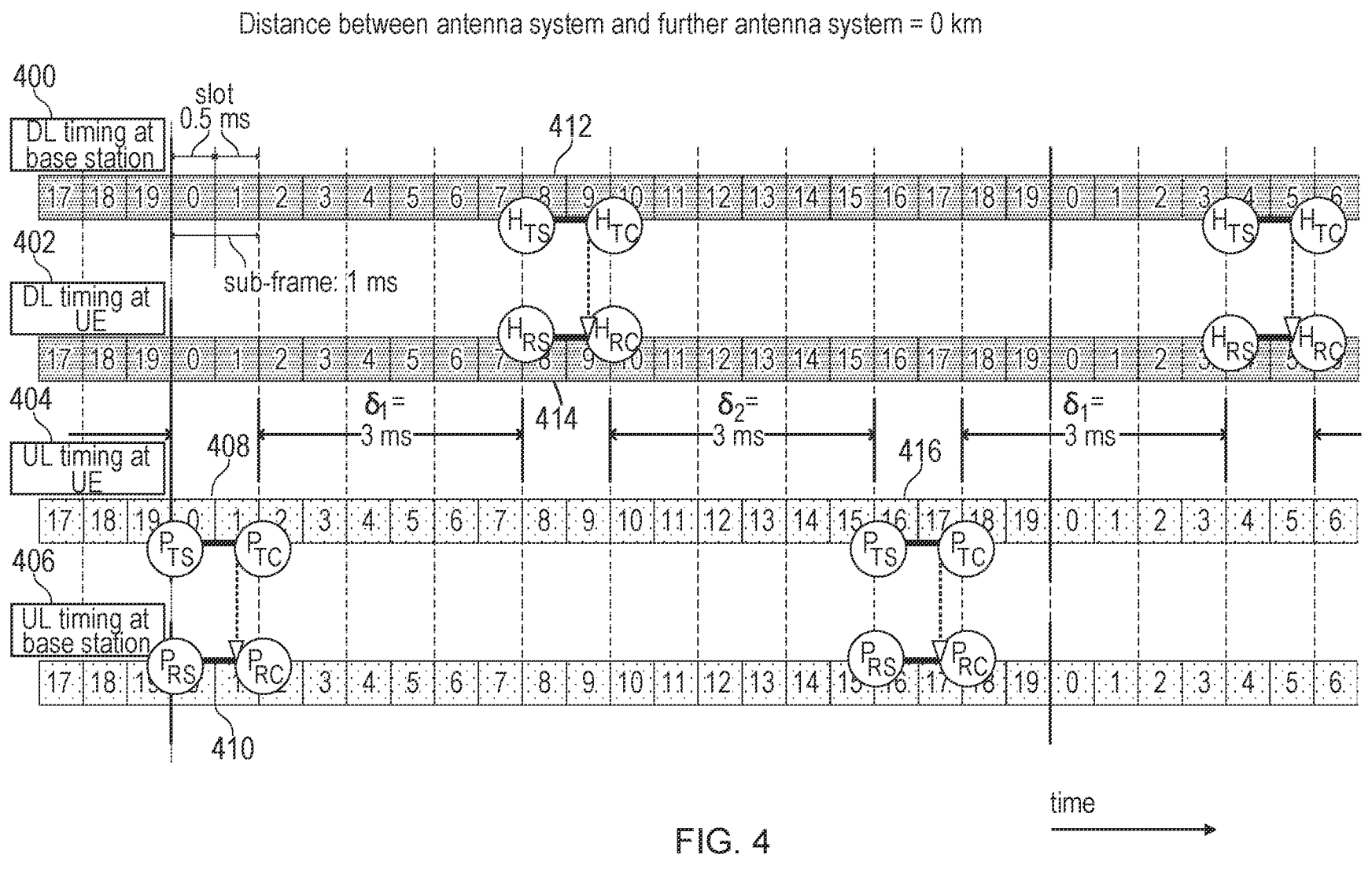
Figure 5:
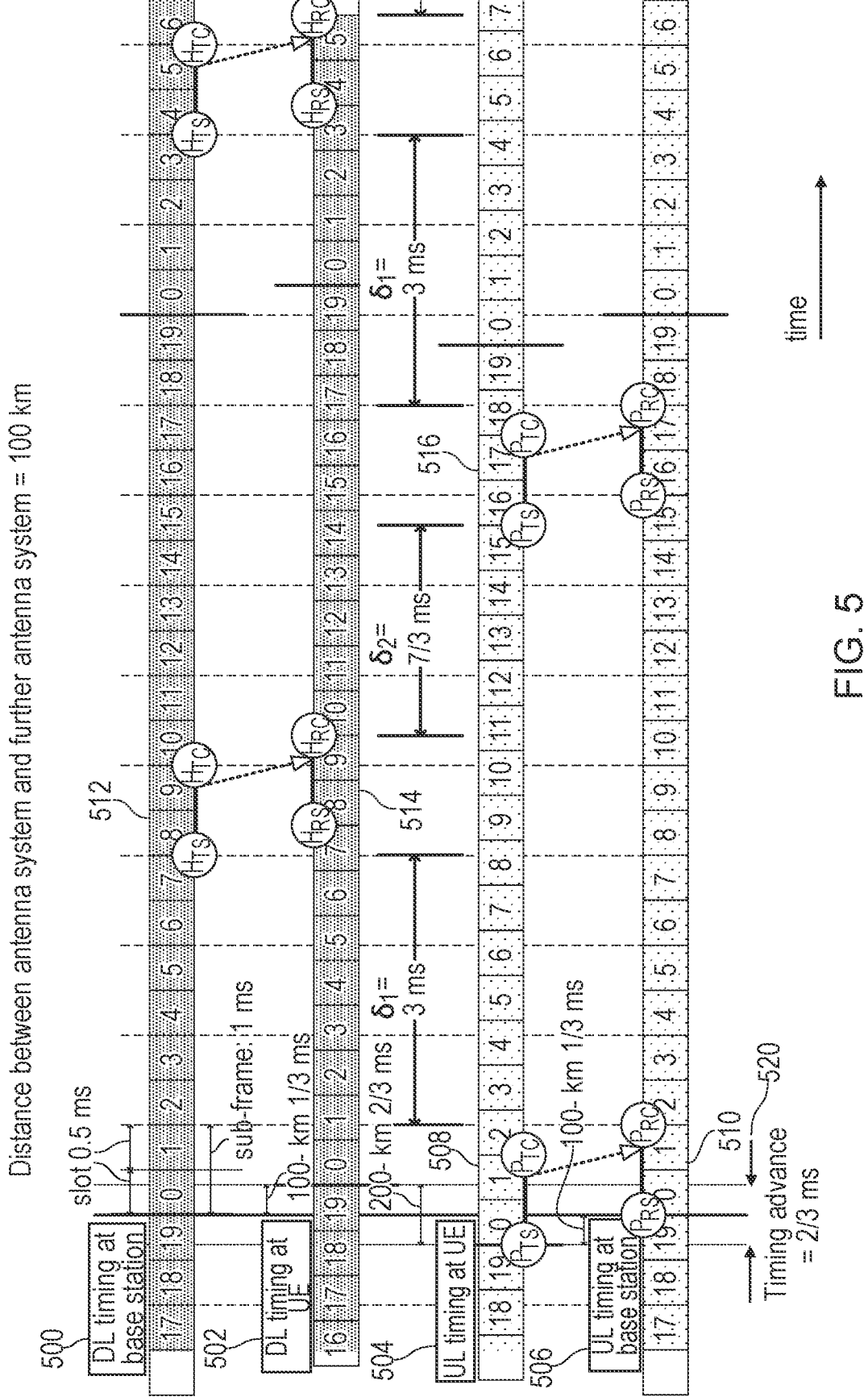
FIG. 5 schematically illustrates timing diagrams relating to the transmission of frames between an apparatus and a wireless communication system in accordance with some configurations of the present techniques.

FIGS. 4 and 5 schematically illustrate the timing of one of the HARQ stop-and-wait processes as illustrated in FIG. 3 (e.g., HARQ 1) over different separation distances. FIG. 4 schematically illustrates a case in which the separation distance between the antenna system and the further antenna system is 0 km. The first timing diagram 400 illustrates the sub-frame timing for transmission of a downlink frame (DL) from the antenna system of the base station. The second timing diagram 402 illustrates the sub-frame timing for receipt of the downlink frame (DL) at the user equipment. The third timing diagram 404 illustrates the transmission of an uplink (UL) frame from the further antenna system of the user equipment. The fourth timing diagram 406 illustrates the receipt of the uplink (UL) frame at the base station. In the illustrated configuration, each of the sub-frames comprises a plurality of slots. Each sub-frame has a duration of 1 ms and each slot of the sub-frame has a duration of 0.5 ms.

As illustrated in FIG. 4, the HARQ 1 process (as defined in FIG. 3) begins with transmission of an uplink sub-frame from the user equipment during sub-frame 0 (slots 0 and 1) at time 408. Because the distance between the antenna system and the further antenna system is zero, the uplink sub-frame arrives at the base station during sub-frame 0 (slots 0 and 1) at time 410 which is coincident with the transmission time 408. The base station proceeds to process the received uplink sub-frame during the time $\delta_1$=3 ms corresponding to the time between the end of the time 410 in which the sub-frame is received and a time 412 at which a downlink sub-frame comprising an acknowledgement or a negative acknowledgement frame is to be transmitted. Because the distance between the antenna system and the further antenna system is zero, the downlink sub-frame arrives at the UE at a time 414 that is coincident with the time 412 at which the downlink sub-frame was transmitted. The UE proceeds to process the received downlink sub-frame during the time $\delta_2$=3 ms corresponding to the time between the end of the time 414 in which the sub-frame is received and a time 416 at which a subsequent uplink sub-frame comprising a further payload data or a retransmission of the payload data transmitted during sub-frame 0 is to be transmitted. The process then repeats with the next uplink transmission occurring at time 416. In the illustrated configuration and at a separation distance of 100 km, both the base station and the UE have 3 ms to process the received data before they have to make a transmission.

In contrast, FIG. 5 schematically illustrates the same HARQ 1 process operating when a separation distance between the antenna system and the further antenna system is 100 km. The first timing diagram 500 illustrates the sub-frame timing for transmission of a downlink frame (DL) from the antenna system of the base station. The second timing diagram 502 illustrates the sub-frame timing for receipt of the downlink frame (DL) at the user equipment. The second timing diagram 502 is offset from the first timing diagram 500 by $\frac{1}{3}$ ms due to the transmission time for a signal transmitted from the base station to travel the 100 km separation distance to arrive at the UE. The third timing diagram 504 illustrates the transmission of an uplink (UL) frame from the further antenna system of the user equipment. The third timing diagram 504 is offset from the second timing diagram 502 by the timing advance 520. In the illustrated example, the timing advance is equal to the round trip time, i.e., $\frac{2}{3}$ ms so the third timing diagram 504 is $\frac{2}{3}$ ms ahead of the second timing diagram 502. As a result, the third timing diagram 504 is ahead of the first timing diagram 500 by $\frac{1}{3}$ ms, i.e., half the round trip time. The fourth timing diagram 506 illustrates the receipt of the uplink (UL) frame at the base station. The fourth timing diagram 506 is aligned with the first timing diagram 500 because this timing indicates the timing kept by the base station. The fourth timing diagram 506 is offset from the third timing diagram by $\frac{1}{3}$ ms, i.e., the transmission delay time for a signal transmitted from the base station to travel the 100 km to the UE. As in the case of FIG. 4, each of the sub-frames comprises a plurality of slots. Each sub-frame has a duration of 1 ms and each slot of the sub-frame has a duration of 0.5 ms.

Consider the HARQ 1 process at a separation distance of 100 km as illustrated in FIG. 5. The UE transmits an uplink data frame in slots 0 and 1 (corresponding to the sub-frame 0) at a transmission time 508. The transmission time 508 is determined by the UE from the known time at which signals from the base station are received and the timing advance 520 that is signalled to the UE by the base station. Due to the transmission time 508 being advanced by the timing advance 520, the uplink data frame is received at the base station at a reception time 510 which is coincident with slots 0 and 1 (corresponding to the sub-frame 0). The base station proceeds to process the received uplink sub-frame during the time $\delta_1$=3 ms corresponding to the time between the end of the time 510 in which the sub-frame is received and a time 512 at which a downlink sub-frame comprising an acknowledgement or a negative acknowledgement frame is to be transmitted. Because the distance between the antenna system (of the base station) and the further antenna system (of the UE) is 100 km, the downlink sub-frame arrives at the UE at a time 514 that occurs $\frac{1}{3}$ ms after the transmission of the downlink sub-frame at the time 512. The UE proceeds to process the received downlink sub-frame during the time $\delta_2$=7/3 ms (equal to the 3 ms processing time at 0 km minus the timing advance 520 of $\frac{2}{3}$ ms) corresponding to the time between the end of the time 514 in which the sub-frame is received and a time 516 at which a subsequent uplink sub-frame comprising a further payload data or a retransmission of the payload data transmitted during sub-frame 0 is to be transmitted. The process then repeats with the next uplink transmission occurring at time 516. In the illustrated configuration, the base station is given 3 ms to process the received data before a transmission is to be performed and the UE is given 7/3 ms to perform the transmission.

For some transmission standards (for example, 4G LTE), the maximum operation distance is 100 km and the corresponding predefined range has a maximum of ⅔ ms corresponding to the maximum operation distance. As a result, the minimum processing times $\delta_1$=3 ms and $\delta_2$=7/3 ms illustrated in FIG. 5 represent a minimum processing time that is provided to each of the base station and the UE respectively. However, due to increases in processing speed of modern telecommunications equipment, both the base station and the UE are able to process the received data in less than this time. The present techniques provide for the calculation of a timing advance that enables synchronisation between the base station and the user equipment that allows an increased separation distance between the base station (antenna system) and the user equipment (further antenna system).

Figure 6:
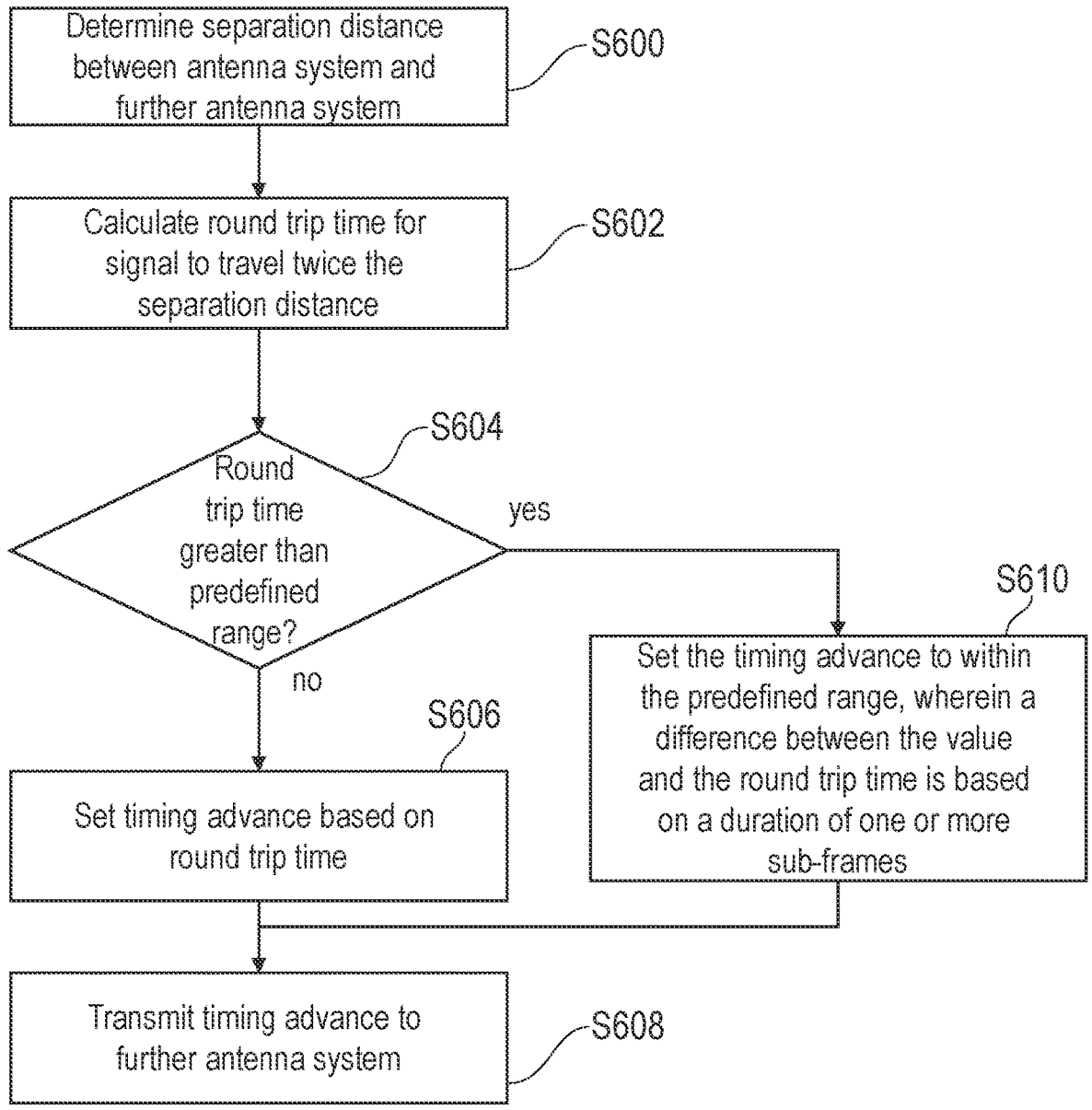
FIG. 6 schematically illustrates a sequence of steps carried out by an apparatus in accordance with some configurations of the present techniques.

FIG. 6 schematically illustrates a method of determining the timing advance according to various configurations of the present techniques. Flow begins at step S600 where the separation distance between the antenna system and the further antenna system is determined. The separation distance could be determined, for example using a known (e.g., fixed) location of the base station and a location of the further antenna system that is determined either from a predetermined known schedule (for example, a known flight path) of the further antenna system, or that is transmitted from the further antenna system (e.g., as determined using a GPS system coupled to the antenna system). In some configurations, the round trip time is calculated by measuring the time delay between the reception of a non-time advanced signal originating from the further antennas system and an indication of opportunity from the antenna system to instruct the further antenna system to transmit its non-time advanced signal. Typically such a signal is transmitted during initial access when the further antenna system seeks to connect to the network, and the antenna system establishes an absolute distance between the antenna system and the further antenna system. Once a link is established, to maintain the link, the antenna system will continuously monitor the relative delay of the UL signal, which at this point is subject to timing advance, and adjust the time advance accordingly to ensure UL synchronisation. Flow then proceeds to step S602 where the round trip time for the signal to travel twice the separation distance is calculated. Flow then proceeds to step S604, where it is determined whether the round trip time is greater than the predefined range, e.g., whether the calculated round trip time can be represented in a finite set of bits that are provided as part of a communication standard for defining the round trip time. If, at step S604, it is determined that the round trip time is not greater than the predefined range, then flow proceeds to step S606, where the timing advance is set based on the round trip time (e.g., the timing advance is set equal to the round trip time). Flow then proceeds to step S608 where the timing advance is transmitted, by the antenna system, to the further antenna system. If, at step S604, it was determined that the round trip time was greater than the predefined range, then flow proceeds to step S610 where the timing advance is set to a value that is within the predefined range. Once the timing advance has been set, flow proceeds to step S608 where the timing advance is transmitted, by the antenna system, to the further antenna system.

Figure 7:
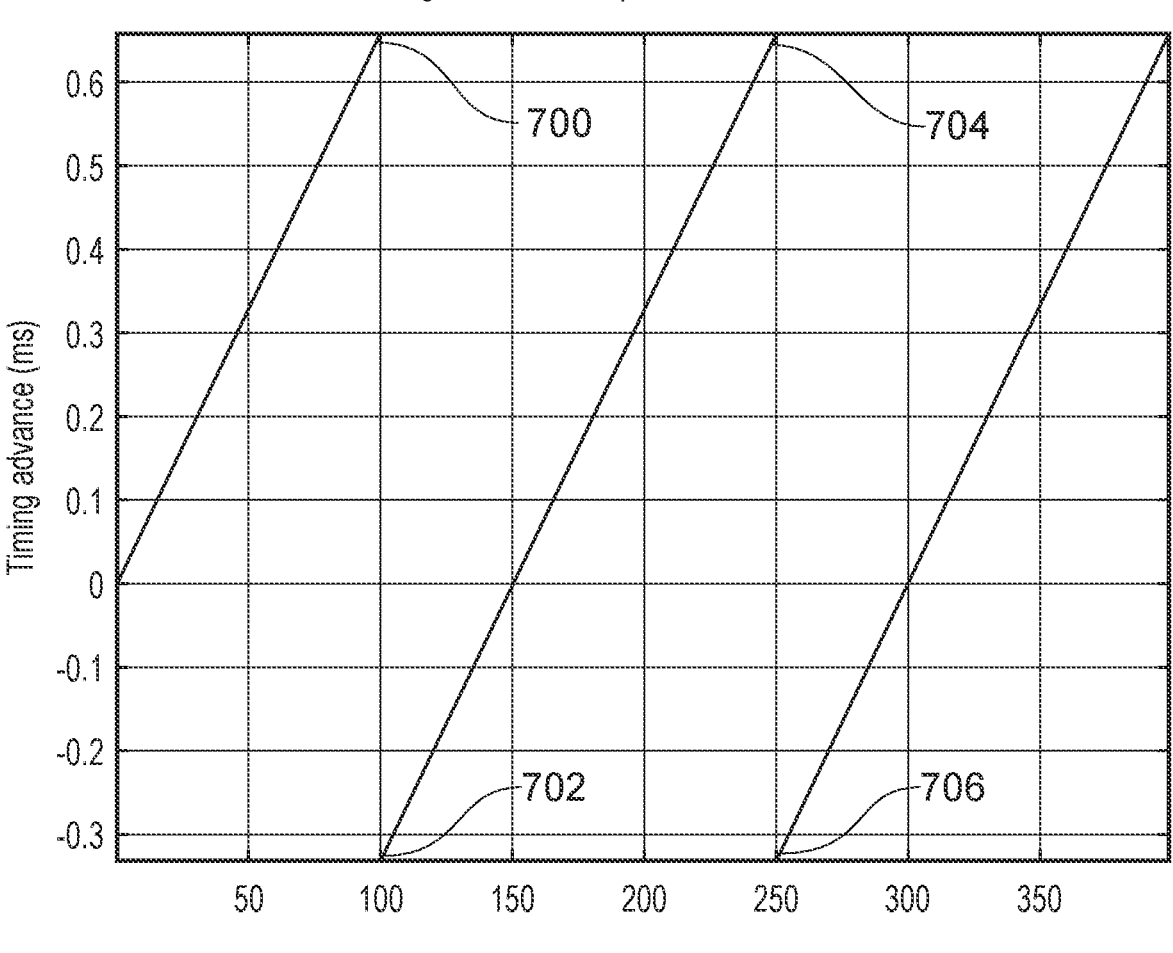
FIG. 7 schematically illustrates a timing advance calculated in accordance with some configurations of the present techniques.

The specific value to which the timing advance is set is determined such that a difference between the round trip time and the value is based on the duration of one or more sub-frames. The specific method by which the timing advance is set may take a variety of forms and the skilled person would be aware of different algorithms that can be used in order to determine a value with this property. In some example configurations, the value may be set (determined) by repeatedly subtracting the duration of a sub-frame from the round trip time until the resulting value falls within the predefined range. Alternatively, a modulus operation could be used to calculate the remainder when the round trip time is divided by a duration of the predefined range. FIG. 7 schematically illustrates the result of calculating the timing advance in this way for an example system in which the predefined range (for example, as defined in a communication standard to which the antenna system and the further antenna system adhere) is from −⅓ ms to ⅔ ms with a sub-frame duration of 1 ms. As can be seen, for separation distances from 0 km to 100 km, the timing advance increases linearly from 0 ms to ⅔ ms. As the separation distance increases above 100 km, the timing advance would have to increase beyond ⅔ ms in order to maintain the synchronisation (alignment) between the sub-frame in which uplink data is transmitted and the sub-frame in which the uplink data is received. However, values greater than ⅔ ms fall outside of the predefined range and therefore cannot be represented as timing advances within the communication standard. Therefore, for round trip times that correspond to separation distances of greater than 100 km, the timing advance is calculated using the method indicated in step S610 of FIG. 6. In particular, the timing advance is set to a value that falls within the predefined range and that is an integer number of sub-frame durations different to the round trip time. As a result, there is a discontinuity between the timing advance 700 calculated for a separation distance of 100 km and the timing advance 702 calculated for separation distances of just over 100 km. In particular, for the distance of just over 100 km, the timing advance 702 is a negative timing advance, i.e., it is a timing delay such that the uplink sub-frame is transmitted later than the UE (further antenna system) would transmit that uplink sub-frame in absence of the timing advance. A further discontinuity is observed between the timing advance 704 calculated for a distance of 250 km and the timing advance 706 that is calculated for a separation distance of just over 250 km.

In some configurations, the base station calculates the timing advance by storing a lookup table indicative of the timing advances set out in FIG. 7. In some configurations, a lookup in the lookup table may be accompanied by linear interpolation in order to minimise the storage required for the storage table. For example, the lookup table could store a number of thresholds corresponding to the discontinuities and values between the discontinuities could be calculated using interpolation. Specifically, the lookup table could store information indicating a first region between 0 km and 100 km as taking timing advance that is linearly calculated based on the separation distance, e.g. the separation distance divided by the speed of light and multiplied by two to obtain the round trip time. The lookup table could also store information indicating a second region for separation distances that are greater than 100 km up to separation distances of 250 km and the timing advance could be calculated linearly in this range, e.g., the separation distance minus 150 km then divided by the speed of light and multiplied by two. In this way, a particularly compact lookup table can be provided. Alternatively, rather than associating separation distance with the timing advance, the lookup table may associate the round trip time with the timing advance.

FIGS. 8 to 13 schematically illustrate the effect of the timing advance calculated according to the method of FIG. 6 for various example separation distances between the antenna system and the further antenna system.

Figure 8:
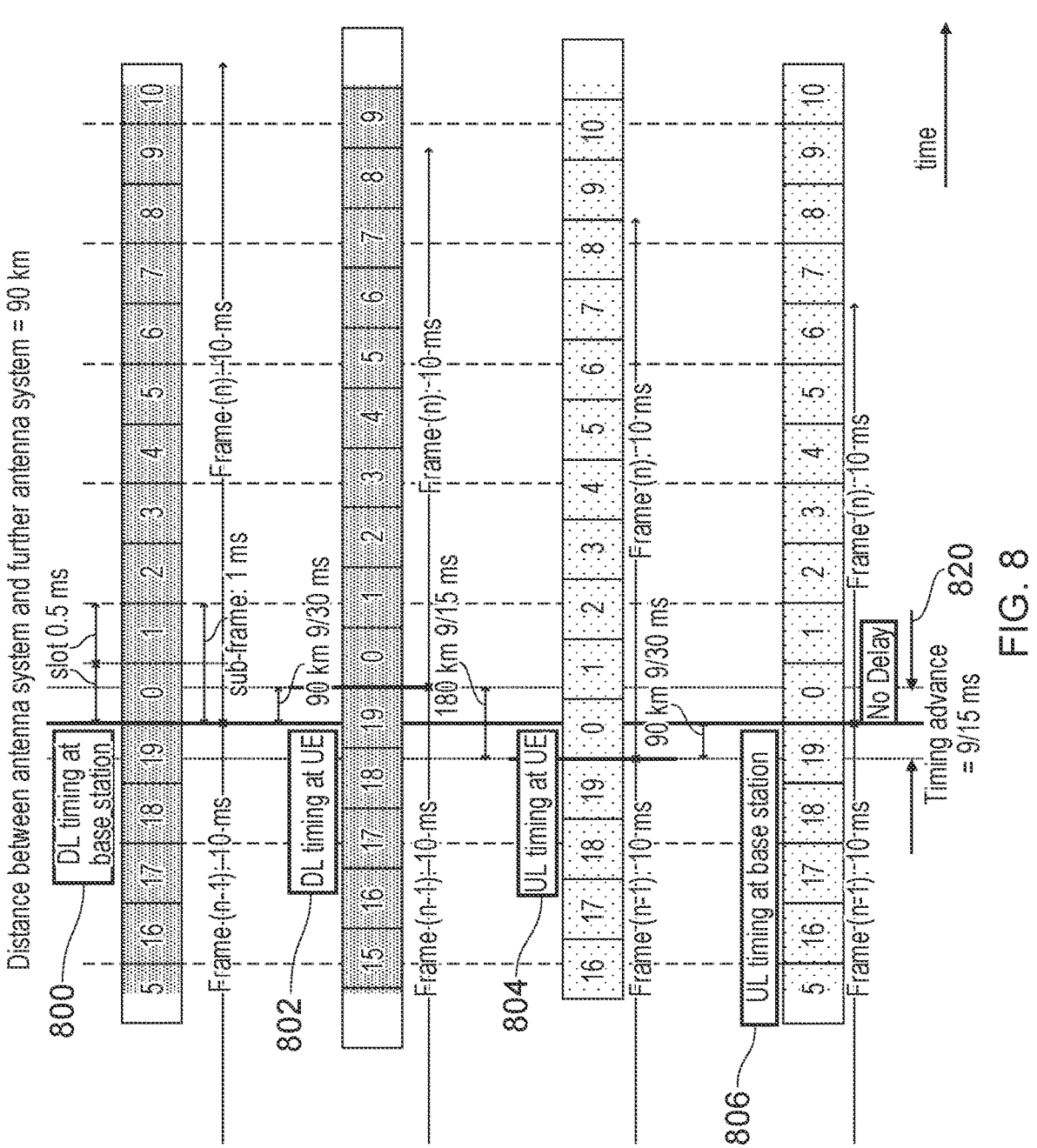
FIG. 8 schematically illustrates timing diagrams relating to the transmission of frames between an apparatus and a wireless communication system in accordance with some configurations of the present techniques.

FIG. 8 schematically illustrates the application of a timing advance at a separation distance between the antenna system and the further antenna system of 90 km. According to the method of FIG. 6 and/or using a lookup table based on FIG. 7, the timing advance 820 is equal to the round trip time of $9/15$ ms. As a result, the timing at the base station (indicated by the downlink timing diagram 800 and the uplink timing diagram 806) is $9/30$ ms (half the timing advance and equal to the propagation time for a downlink signal transmitted from the base station and received at the UE) ahead of the timing 802 at which the UE receives the downlink transmission. The UE applies the timing advance of $9/15$ ms to determine the timing 804 of the uplink transmissions such that an uplink data sub-frame (e.g., sub-frame 0 comprising slot 0 and slot 1) transmitted by the UE is received at the base station in the same sub-frame (e.g., sub-frame 0 comprising slot 0 and slot 1) according to the timing at the base station.

Figure 9:
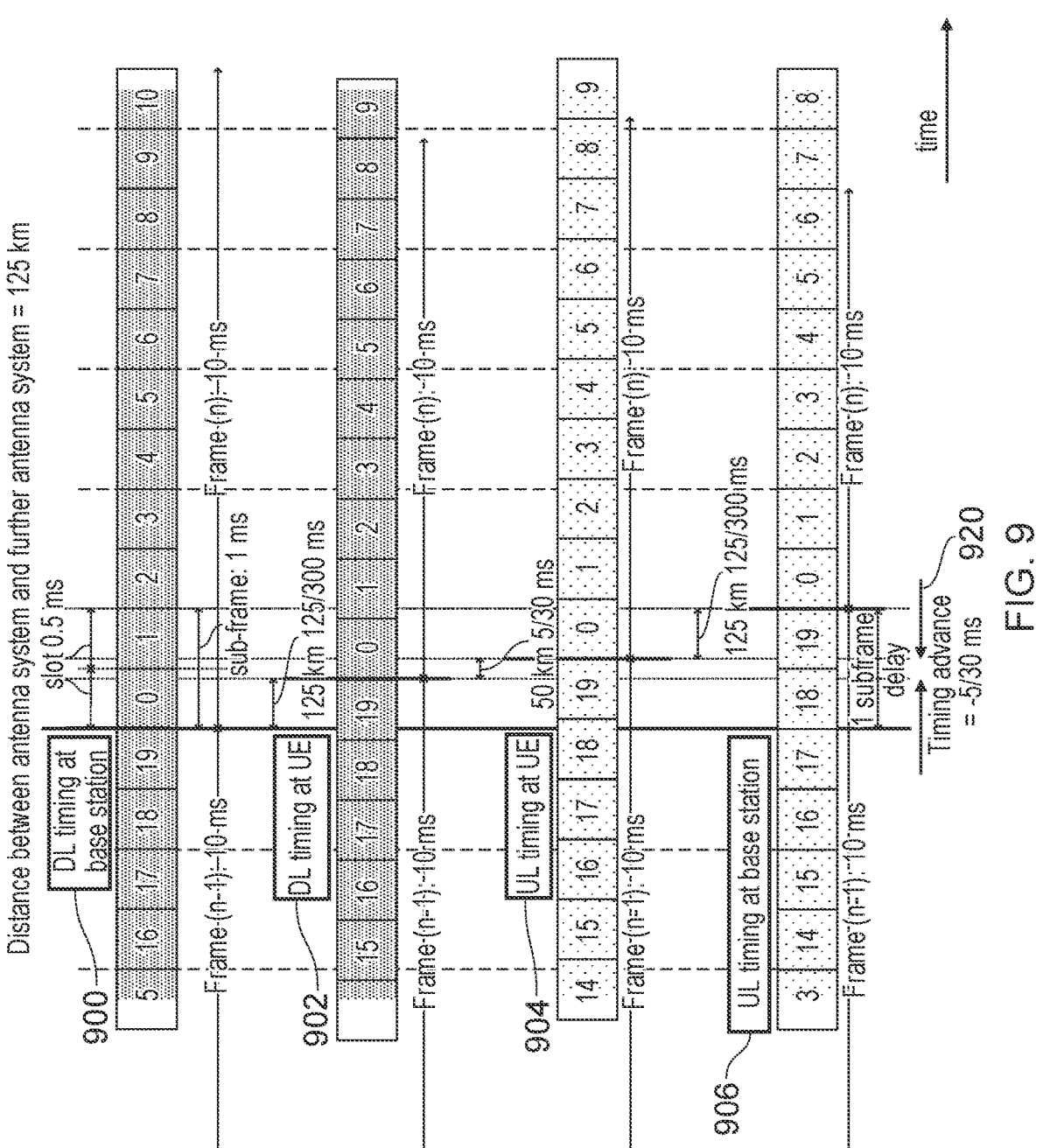
FIG. 9 schematically illustrates timing diagrams relating to the transmission of frames between an apparatus and a wireless communication system in accordance with some configurations of the present techniques.

FIG. 9 schematically illustrates the application of a timing advance at a separation distance between the antenna system and the further antenna system of 125 km. The round trip time for a separation distance of 125 km is equal to $5/6$ ms which is greater than the maximum value that can be represented by the predefined range (i.e., $2/3$ ms). According to the method of FIG. 6 and/or using a lookup table based on FIG. 7, the timing advance 920 is set to a value that is in the predefined range but that differs from the round trip time by an integer number of sub-frame durations. As a result, the timing advance is set to $-5/30$ ms which is 1 ms less than the round trip time of $5/6$ ms. Therefore, the timing advance is set equal to a value that can be represented within the predefined range and the base station is able to signal the timing advance to the user equipment. As a result of the timing advance, the downlink timing at the base station (indicated by the downlink timing diagram 900) is $125/300$ ms (half the round trip time equal to the propagation time for a downlink signal transmitted from the base station and received at the UE) ahead of the timing 902 at which the UE receives the downlink transmission. The UE applies the timing advance of $-5/30$ ms (i.e., a timing delay of $5/30$ ms) to determine the timing 904 of the uplink transmissions such that an uplink data sub-frame (e.g., sub-frame 0 comprising slot 0 and slot 1) transmitted by the UE is received at the base station at a timing 906 that is coincident with a sub-frame of the transmission frame (as indicated by the timing 900). In this case however, due to the application of the timing advance, the uplink data is received one sub-frame later than the sub-frame in which it was transmitted (e.g., corresponding to sub-frame 1 of the downlink timing 900 comprising slot 2 and slot 3) according to the timing at the base station. As a result, the UE is working to a different timing schedule to the one that the base station is using. The UE transmits the uplink data in a particular sub-frame and that data is received by the base station in the next sub-frame. This discrepancy is dealt with by the base station which (assuming the stop-and-wait processes illustrated in FIG. 3 are used) has a shorter time in which to process the uplink data. However, the UE is ignorant of this discrepancy and continues to receive downlink data in an expected sub-frame and (because the timing advance remains within the predefined range) has the same minimum time to process the downlink data as in a case where the separation distance was restricted to 100 km.

Figure 10:
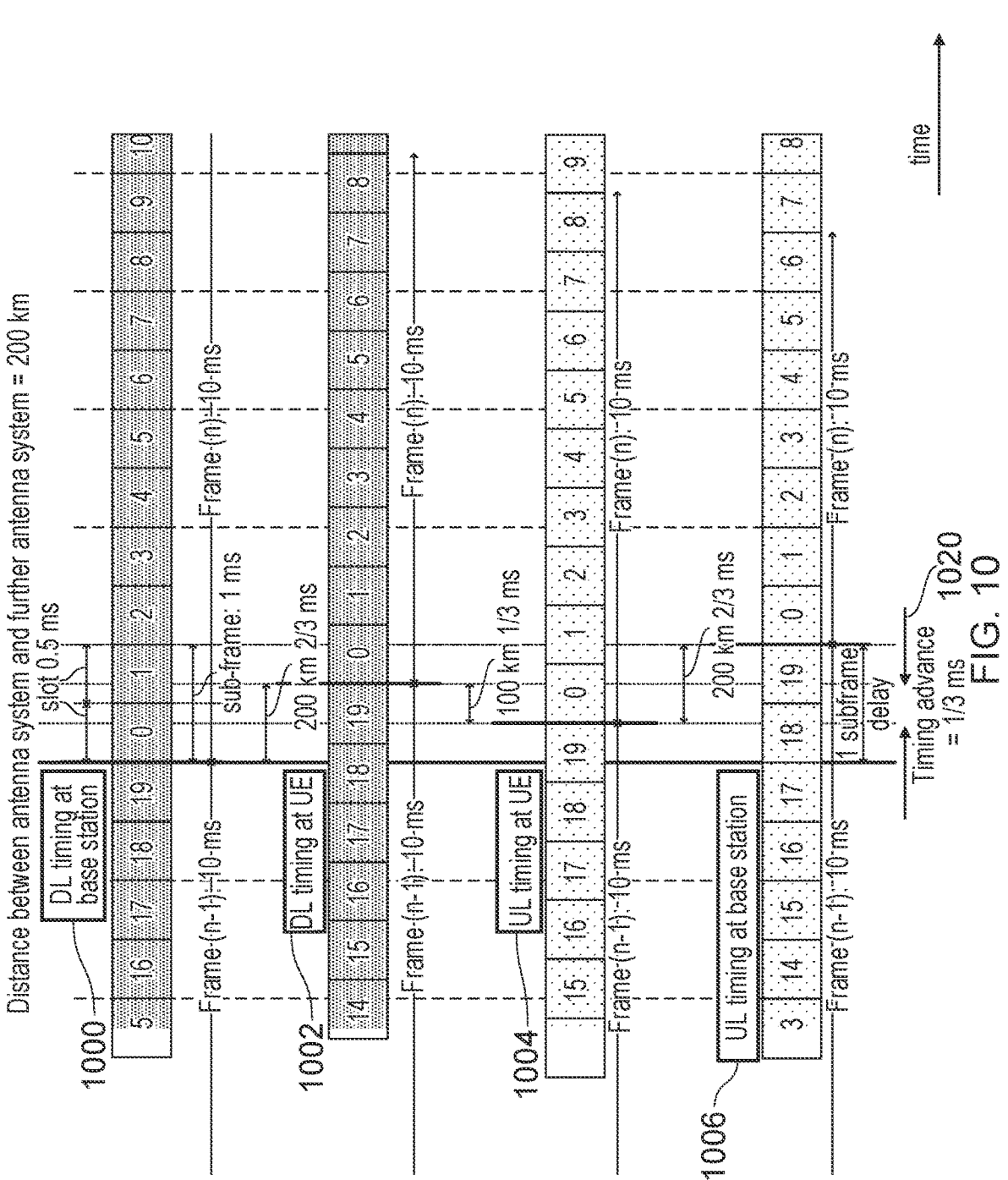
FIG. 10 schematically illustrates timing diagrams relating to the transmission of frames between an apparatus and a wireless communication system in accordance with some configurations of the present techniques.

FIG. 10 schematically illustrates the application of a timing advance at a separation distance between the antenna system and the further antenna system of 200 km. The round trip time for a separation distance of 200 km is equal to 4/3 ms which is greater than the maximum value that can be represented by the predefined range (i.e., $2/3$ ms). According to the method of FIG. 6 and/or using a lookup table based on FIG. 7, the timing advance 1020 is set to a value that is in the predefined range but that differs from the round trip time by an integer number of sub-frame durations. As a result, the timing advance is set to $1/3$ ms which is 1 ms less than the round trip time of 4/3 ms. Therefore, the timing advance is set equal to a value that can be represented within the predefined range and the base station is able to signal the timing advance to the user equipment. As a result of the timing advance, the downlink timing at the base station (indicated by the downlink timing diagram 1000) is $1/3$ ms (half the round trip time equal to the propagation time for a downlink signal transmitted from the base station and received at the UE) ahead of the timing 1002 at which the UE receives the downlink transmission. The UE applies the timing advance of $1/3$ ms to determine the timing 1004 of the uplink transmissions such that an uplink data sub-frame (e.g., sub-frame 0 comprising slot 0 and slot 1) transmitted by the UE is received at the base station at a timing 1006 that is coincident with a sub-frame of the transmission frame (as indicated by the timing 1000). In this case however, due to the application of the timing advance, the uplink data is received one sub-frame later than the sub-frame in which it was transmitted (e.g., corresponding to sub-frame 1 of the timing 1000 comprising slot 2 and slot 3) according to the timing at the base station. As a result, the UE is working to a different timing schedule to the one that the base station is using. The UE transmits the uplink data in a particular sub-frame and that data is received by the base station in the next sub-frame. This discrepancy is dealt with by the base station which (assuming the stop-and-wait processes illustrated in FIG. 3 are used) has a shorter time in which to process the uplink data. However, the UE is ignorant of this discrepancy and continues to receive downlink data in an expected sub-frame and (because the timing advance remains within the predefined range) has the same minimum time to process the downlink data as in a case where the separation distance was restricted to 100 km.

Figure 11:
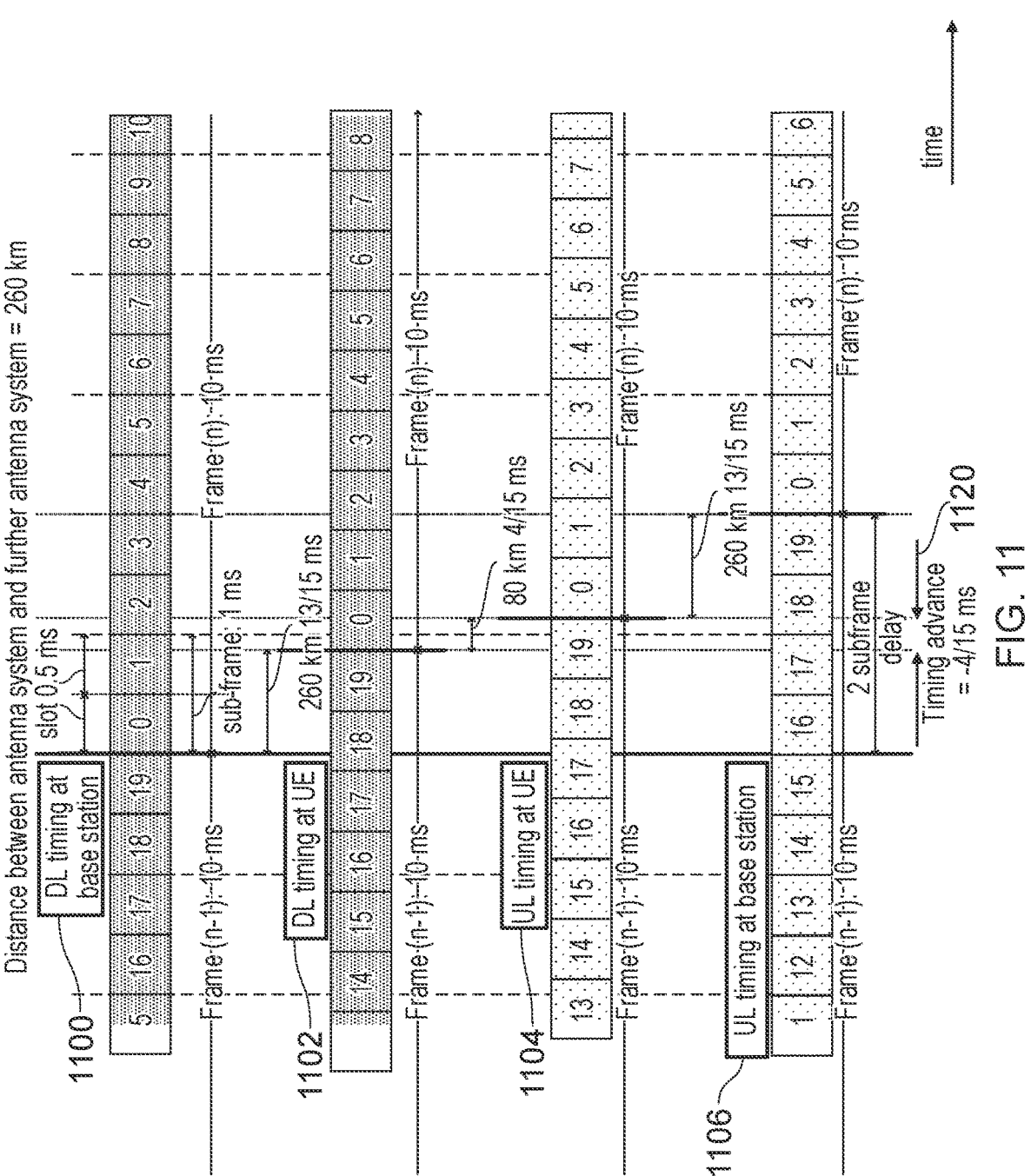
FIG. 11 schematically illustrates timing diagrams relating to the transmission of frames between an apparatus and a wireless communication system in accordance with some configurations of the present techniques.

FIG. 11 schematically illustrates the application of a timing advance at a separation distance between the antenna system and the further antenna system of 260 km. The round trip time for a separation distance of 260 km is equal to 26/15 ms which is greater than the maximum value that can be represented by the predefined range (i.e., $2/3$ ms). According to the method of FIG. 6 and/or using a lookup table based on FIG. 7, the timing advance 1120 is set to a value that is in the predefined range but that differs from the round trip time by an integer number of sub-frame durations. As a result, the timing advance is set to $-4/15$ ms which is 2 ms less than the round trip time of 26/15 ms. Therefore, the timing advance is set equal to a value that can be represented within the predefined range and the base station is able to signal the timing advance to the user equipment. As a result of the timing advance, the downlink timing at the base station (indicated by the downlink timing diagram 1100) is $13/15$ ms (half the round trip time equal to the propagation time for a downlink signal transmitted from the base station and received at the UE) ahead of the timing 1102 at which the UE receives the downlink transmission. The UE applies the timing advance of $-4/15$ ms (i.e., a timing delay of $4/15$ ms) to determine the timing 1104 of the uplink transmissions such that an uplink data sub-frame (e.g., sub-frame 0 comprising slot 0 and slot 1) transmitted by the UE is received at the base station at a timing 1106 that is coincident with a sub-frame of the transmission frame (as indicated by the timing 1100). In this case however, due to the application of the timing advance, the uplink data is received two sub-frames later than the sub-frame in which it was transmitted (e.g., corresponding to sub-frame 2 of the timing 1100 comprising slot 4 and slot 5) according to the timing at the base station. As a result, the UE is working to a different timing schedule to the one that the base station is using. The UE transmits the uplink data in a particular sub-frame and that data is received by the base station in the next sub-frame. This discrepancy is dealt with by the base station which (assuming the stop-and-wait processes illustrated in FIG. 3 are used) has a shorter time in which to process the uplink data. However, the UE is ignorant of this discrepancy and continues to receive downlink data in an expected sub-frame and (because the timing advance remains within the predefined range) has the same minimum time to process the downlink data as in a case where the separation distance was restricted to 100 km.

Figure 12:
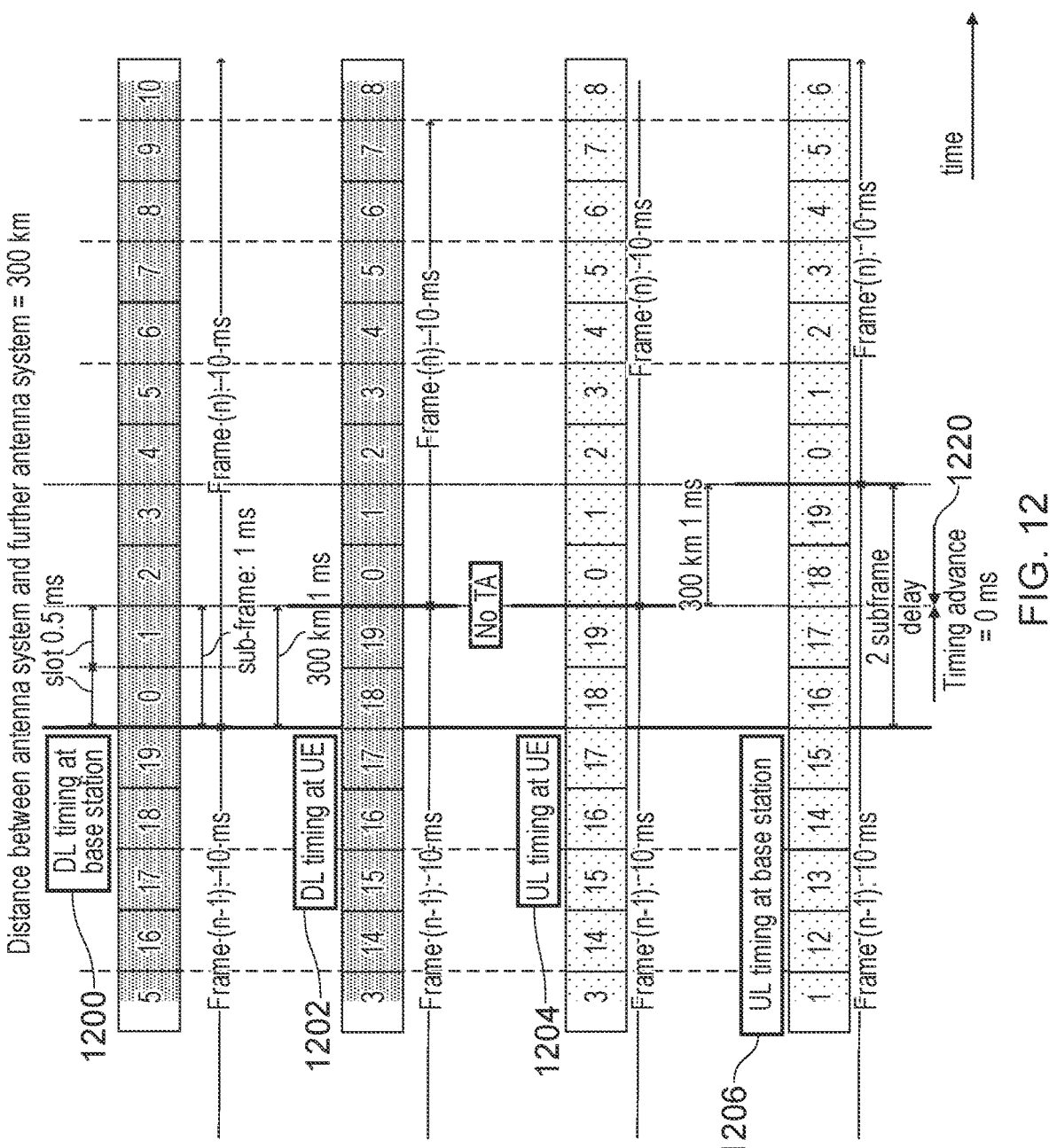
FIG. 12 schematically illustrates timing diagrams relating to the transmission of frames between an apparatus and a wireless communication system in accordance with some configurations of the present techniques.

FIG. 12 schematically illustrates the application of a timing advance at a separation distance between the antenna system and the further antenna system of 300 km. The round trip time for a separation distance of 300 km is equal to 2 ms which is greater than the maximum value that can be represented by the predefined range (i.e., $2/3$ ms). According to the method of FIG. 6 and/or using a lookup table based on FIG. 7, the timing advance 1220 is set to a value that is in the predefined range but that differs from the round trip time by an integer number of sub-frame durations. As a result, the timing advance is set to 0 ms, which is 2 ms less than the round trip time of 2 ms. Therefore, the timing advance is set equal to a value that can be represented within the predefined range and the base station is able to signal the timing advance to the user equipment. As a result of the timing advance, the downlink timing at the base station (indicated by the downlink timing diagram 1200) is 1 ms (half the round trip time equal to the propagation time for a downlink signal transmitted from the base station and received at the UE) ahead of the timing 1202 at which the UE receives the downlink transmission. The UE applies the timing advance of 0 ms to determine the timing 1204 of the uplink transmissions such that an uplink data sub-frame (e.g., sub-frame 0 comprising slot 0 and slot 1) transmitted by the UE is received at the base station at a timing 1206 that is coincident with a sub-frame of the transmission frame (as indicated by the timing 1200). In this case however, due to the application of the timing advance, the uplink data is received two sub-frames later than the sub-frame in which it was transmitted (e.g., corresponding to sub-frame 2 of the timing 1200 comprising slot 4 and slot 5) according to the timing at the base station. As a result, the UE is working to a different timing schedule to the one that the base station is using. The UE transmits the uplink data in a particular sub-frame and that data is received by the base station in the next sub-frame. This discrepancy is dealt with by the base station which (assuming the stop-and-wait processes illustrated in FIG. 3 are used) has a shorter time in which to process the uplink data. However, the UE is ignorant of this discrepancy and continues to receive downlink data in an expected sub-frame and (because the timing advance remains within the predefined range) has the same minimum time to process the downlink data as in a case where the separation distance was restricted to 100 km.

Figure 13:
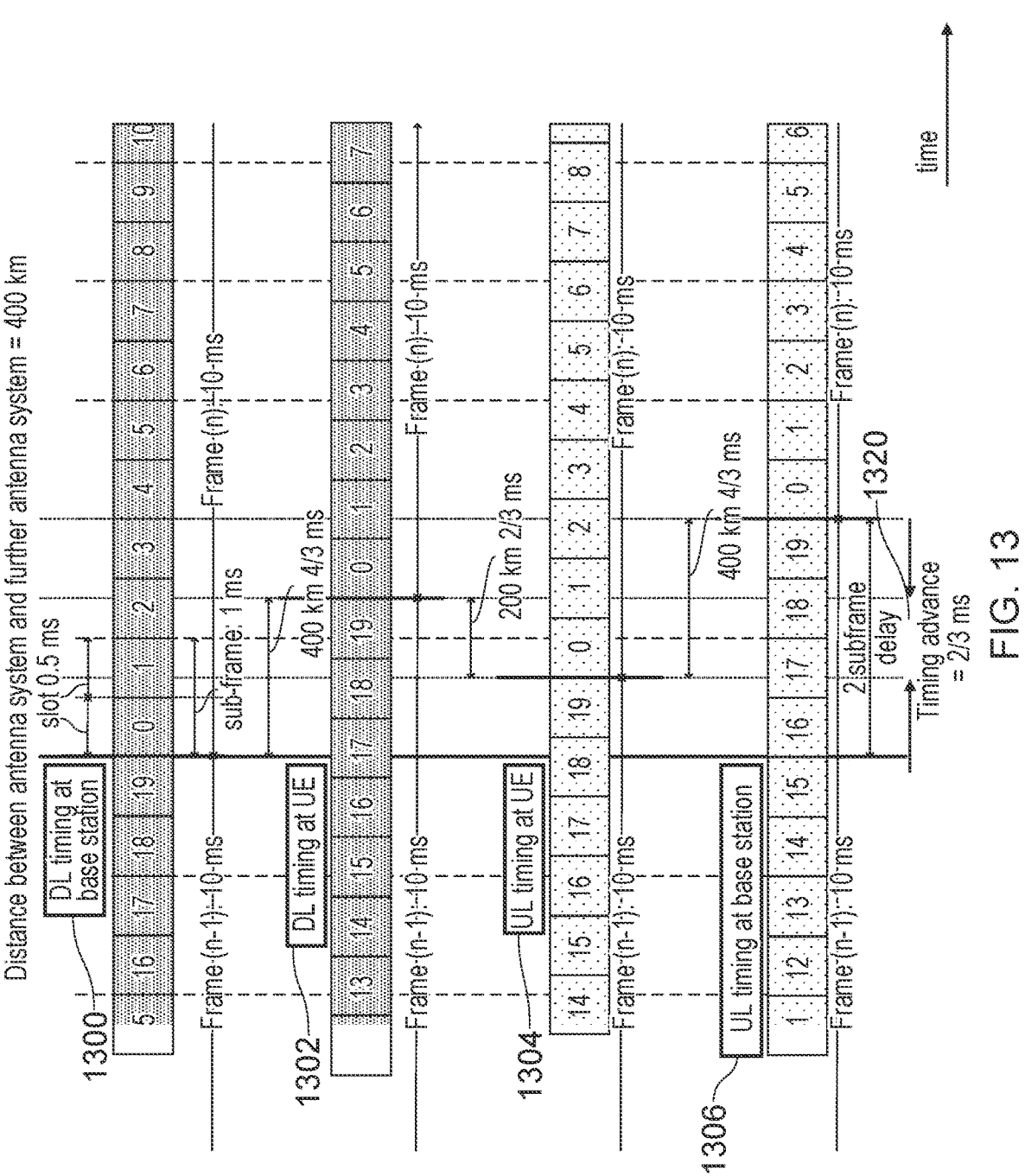
FIG. 13 schematically illustrates timing diagrams relating to the transmission of frames between an apparatus and a wireless communication system in accordance with some configurations of the present techniques.

FIG. 13 schematically illustrates the application of a timing advance at a separation distance between the antenna system and the further antenna system of 400 km. The round trip time for a separation distance of 400 km is equal to 8/3 ms which is greater than the maximum value that can be represented by the predefined range (i.e., $2/3$ ms). According to the method of FIG. 6 and/or using a lookup table based on FIG. 7, the timing advance 1320 is set to a value that is in the predefined range but that differs from the round trip time by an integer number of sub-frame durations. As a result, the timing advance is set to $2/3$ ms, which is 2 ms less than the round trip time of 8/3 ms. Therefore, the timing advance is set equal to a value that can be represented within the predefined range and the base station is able to signal the timing advance to the user equipment. As a result of the timing advance, the downlink timing at the base station (indicated by the downlink timing diagram 1300) is 4/3 ms (half the round trip time equal to the propagation time for a downlink signal transmitted from the base station and received at the UE) ahead of the timing 1302 at which the UE receives the downlink transmission. The UE applies the timing advance of $2/3$ ms to determine the timing 1304 of the uplink transmissions such that an uplink data sub-frame (e.g., sub-frame 0 comprising slot 0 and slot 1) transmitted by the UE is received at the base station at a timing 1306 that is coincident with a sub-frame of the transmission frame (as indicated by the timing 1300). In this case however, due to the application of the timing advance, the uplink data is received two sub-frames later than the sub-frame in which it was transmitted (e.g., corresponding to sub-frame 2 of the timing 1300 comprising slot 4 and slot 5) according to the timing at the base station. As a result, the UE is working to a different timing schedule to the one that the base station is using. The UE transmits the uplink data in a particular sub-frame and that data is received by the base station in the next sub-frame. This discrepancy is dealt with by the base station which (assuming the stop-and-wait processes illustrated in FIG. 3 are used) has a shorter time in which to process the uplink data. However, the UE is ignorant of this discrepancy and continues to receive downlink data in an expected sub-frame and (because the timing advance remains within the predefined range) has the same minimum time to process the downlink data as in a case where the separation distance was restricted to 100 km.

The skilled person would recognise that the predefined range may vary in different systems and has been defined as covering the range from $-1/3$ ms to $2/3$ ms for illustration purpose only. The predefined range may be set differently when different communication standards are used or when different methods of encoding of the timing advance are used. It would also be readily apparent to the skilled person that the fraction of the predefined range that is a positive timing advance and the fraction of the predefined range that is a negative timing advance may vary dependent on the particular implementation. For example, in some configurations, the predefined range may be set to from 0 ms to 1 ms covering a timing range of 1 ms. Alternatively, in some configurations, the predefined range may be set to from $-2/3$ ms to 4/3 ms covering a timing range of 2 ms.

As has been discussed, when the maximum operation distance between the antenna system and the further antenna system is increased, the minimum processing time that is available to the UE is unchanged from the minimum processing time that is available to a UE with a maximum operable range corresponding to the maximum valuable that is defined in the predefined range. However, the time that is afforded to the base station to process an uplink transmission is reduced from the 0 km maximum processing time by a number of sub-frames equal to the difference between the round trip time and the value indicated by the timing advance. Whilst this can be compensated for using faster processing at the base station, in order to extend the maximum operable range the number of sub-frames between the sub-frame in which the uplink data is transmitted and the corresponding sub-frame in which downlink data (e.g., a HARQ acknowledgement frame) is transmitted is increased.

FIG. 14 schematically illustrates a method by which the total number of sub-frames and the sub-frames between different transmissions can be set. Flow begins at step S1400 where the maximum operable separation distance is determined. This may be determined, for example, based on a design parameter of the system. Flow then proceeds to step S1402 where the minimum number of sub-frames between the beginning of transmission of data and transmission of the beginning of transmission of an acknowledgement is determined. This value is denoted M1 and may be set, for example, to indicate a minimum amount of processing time (expressed as a number of sub-frames) that are required in order to allow the base station sufficient time to process an uplink sub-frame. Flow then proceeds to step S1404 where the minimum number of sub-frames between the beginning of downlink transmission of an acknowledgement and the beginning of transmission (or retransmission) of uplink data is determined. This value is denoted M2. Flow then proceeds to step S1406 where the maximum round trip time for a signal to travel twice the maximum operable separation distance is calculated. Flow then proceeds to step S1408 where a number of multiples (denoted N) of a duration of a sub-frame that need to be subtracted from the maximum round trip time in order to be within the predetermined range is calculated. Flow then proceeds to step S1410 where the total number of required sub-frames (equal to N+M1+M2) is calculated. Flow then proceeds to step S1412 where (optionally) a number of HARQ stop-and-wait processes equal to the number of sub-frames is determined.

Figure 15:
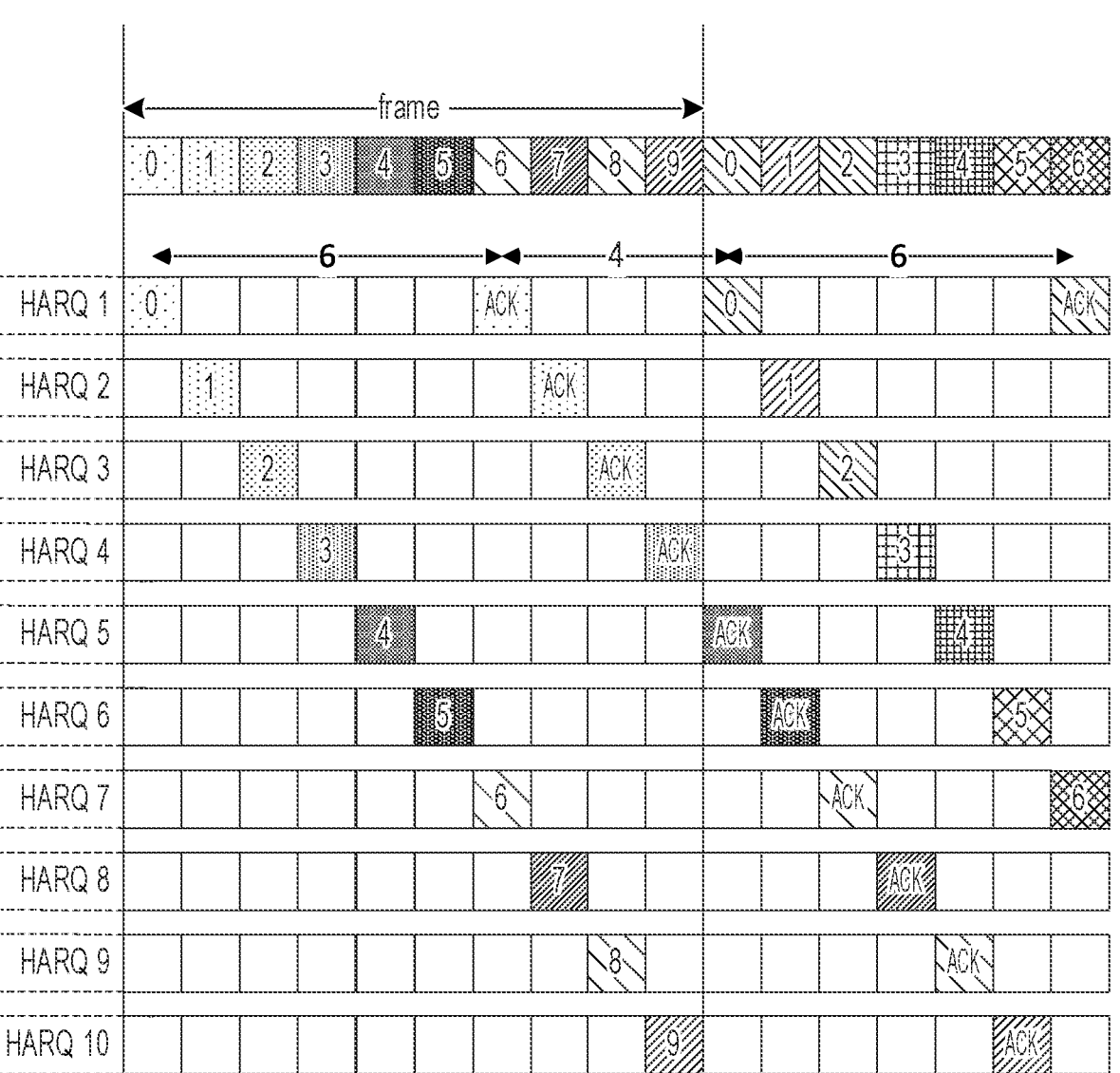
FIG. 15 schematically illustrates a sequence of HARQ stop-and-wait processes in accordance with some configurations of the present techniques.

FIG. 15 schematically illustrates a number of HARQ stop-and-wait processes defined for a maximum operable separation distance of 400 km for which the minimum number of sub-frames between transmission of data and transmission of an acknowledgement (M1) is equal to 4 sub-frames and the minimum number of sub-frames between the beginning of transmission of acknowledgement and the beginning of (re) transmission of data (M2) is also set to 4 sub-frames. It is assumed that the predefined range is between −⅓ ms and ⅔ ms and the sub-frame duration is set to 1 ms. As a result, the value of N, i.e., the number of multiples of the predefined range that need to be subtracted from the maximum round trip time to be within the predefined range is 2 corresponding to the example timing set out in FIG. 13. As a result, the total number of sub-frames that are required for a complete cycle of each HARQ stop-and-wait cycle is 10 sub-frames, i.e., a whole 10 sub-frame transmission frame. As is illustrated in FIG. 15, the use of 10 sub-frames in each of the HARQ stop-and-wait processes enables 10 HARQ stop-and-wait processes to be defined in order to make maximum usage of the available bandwidth.

Figure 17:
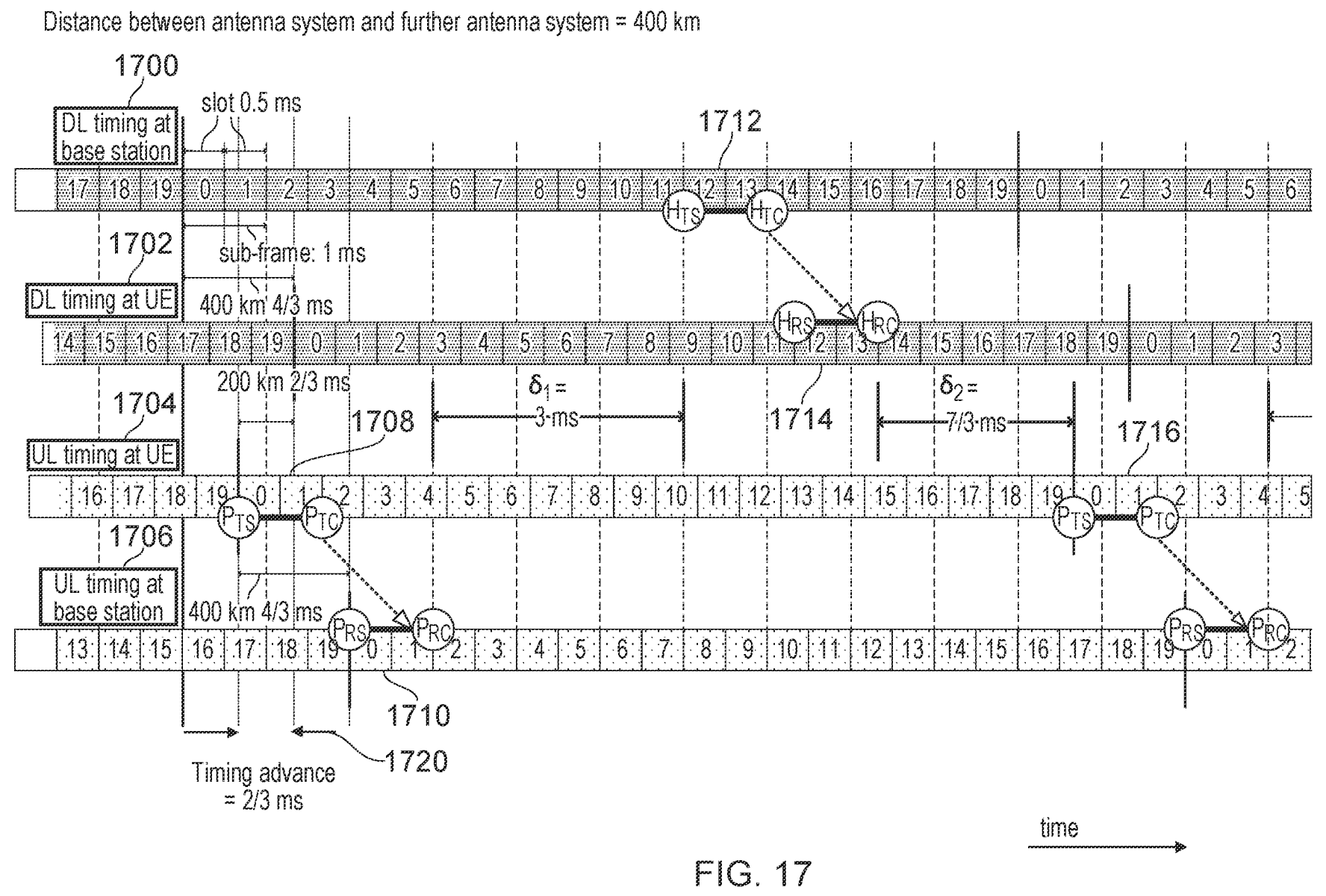

FIGS. 16 and 17 schematically illustrate the timing of one of the HARQ stop-and-wait processes as illustrated in FIG. 15 (e.g., HARQ 1) over different separation distances. FIG. 16 schematically illustrates a case in which the separation distance between the antenna system and the further antenna system is just over 100 km. The first timing diagram 1600 illustrates the sub-frame timing for transmission of a downlink frame (DL) from the antenna system of the base station. The second timing diagram 1602 illustrates the sub-frame timing for receipt of the downlink frame (DL) at the user equipment. The third timing diagram 1604 illustrates the transmission of an uplink (UL) frame from the further antenna system of the user equipment. The fourth timing diagram 1606 illustrates the receipt of the uplink (UL) frame at the base station. In the illustrated configuration, each of the sub-frames comprises a plurality of slots. Each sub-frame has a duration of 1 ms and each slot of the sub-frame has a duration of 0.5 ms.

Considering the HARQ 1 process of FIG. 15 at a separation distance of just over 100 km as illustrated in FIG. 16. The round trip time for a separation distance of just over 100 km is equal to just over ⅔ ms which is greater than the maximum value that can be represented by the predefined range (i.e., ⅔ ms). According to the method of FIG. 6 and/or using a lookup table based on FIG. 7, the timing advance 1620 is set to a value that is in the predefined range but that differs from the round trip time by an integer number of sub-frame durations. As a result, the timing advance is set to a value that is just greater than −⅓ ms which is 1 ms less than the round trip time of just over ⅔ ms. Therefore, the timing advance is set equal to a value that can be represented within the predefined range and the base station is able to signal the timing advance to the user equipment. The UE transmits an uplink data frame in slots 0 and 1 (corresponding to the sub-frame 0) at a transmission time 1608. The transmission time 1608 is determined by the UE from the known time at which signals from the base station are received and the timing advance 1620 that is signalled to the UE by the base station. In this case, the timing advance is a negative timing advance, i.e., it is a timing delay of ⅓ ms. Due to the transmission time 1608 being delayed by ⅓ ms, the uplink data frame is received at the base station at a reception time 1610 which is coincident with slots 2 and 3 of the timing 1600 at which the base station transmits the downlink signal (corresponding to the sub-frame 1).

The base station proceeds to process the received uplink sub-frame during the time $\delta_1$=4 ms (equal to the 0 km maximum processing time reduced by a duration of a number of sub-frames equal to the difference between the round trip time and the value indicated by the timing advance) corresponding to the time between the end of the time 1610 in which the sub-frame is received and a time 1612 at which a downlink sub-frame comprising an acknowledgement or a negative acknowledgement frame is to be transmitted. Because the distance between the antenna system (of the base station) and the further antenna system (of the UE) is just over 100 km, the downlink sub-frame arrives at the UE at a time 1614 that occurs just over ⅓ ms after the transmission of the downlink sub-frame at the time 1612. The UE proceeds to process the received downlink sub-frame during the time $\delta_2$=10/3 ms (equal to the 3 ms processing time at 0 km minus the timing advance 1620 of −⅓ ms) corresponding to the time between the end of the time 1614 in which the sub-frame is received and a time 1616 at which a subsequent uplink sub-frame comprising a further payload data or a retransmission of the payload data transmitted during sub-frame 0 is to be transmitted. The process then repeats with the next uplink transmission occurring at time 1616. In the illustrated configuration, the base station is given 4 ms to process the received data before a transmission is to be performed and the UE is given 10/3 ms to perform the transmission.

Considering the HARQ 1 process of FIG. 15 at a separation distance of 400 km as illustrated in FIG. 17. The round trip time for a separation distance of 400 km is equal to just over 8/3 ms which is greater than the maximum value that can be represented by the predefined range (i.e., ⅔ ms). According to the method of FIG. 6 and/or using a lookup table based on FIG. 7, the timing advance 1720 is set to a value that is in the predefined range but that differs from the round trip time by an integer number of sub-frame durations. As a result, the timing advance is set to a value of ⅔ ms which is 2 ms less than the round trip time of 8/3 ms. Therefore, the timing advance is set equal to a value that can be represented within the predefined range and the base station is able to signal the timing advance to the user equipment. The UE transmits an uplink data frame in slots 0 and 1 (corresponding to the sub-frame 0) at a transmission time 1708. The transmission time 1708 is determined by the UE from the known time at which signals from the base station are received and the timing advance 1720 that is signalled to the UE by the base station. In this case, the timing advance is ⅔ ms. Due to the transmission time 1708 being advanced by ⅔ ms, the uplink data frame is received at the base station at a reception time 1710 which is coincident with slots 4 and 5 of the timing 1700 at which the base station transmits the downlink signal (corresponding to the sub-frame 2).

The base station proceeds to process the received uplink sub-frame during the time $\delta_1=3$ ms (equal to the 0 km maximum processing time reduced by a duration of a number of sub-frames equal to the difference between the round trip time and the value indicated by the timing advance) corresponding to the time between the end of the time 1710 in which the sub-frame is received and a time 1712 at which a downlink sub-frame comprising an acknowledgement or a negative acknowledgement frame is to be transmitted. Because the distance between the antenna system (of the base station) and the further antenna system (of the UE) is 400 km, the downlink sub-frame arrives at the UE at a time 1714 that occurs 4/3 ms after the transmission of the downlink sub-frame at the time 1712. The UE proceeds to process the received downlink sub-frame during the time $\delta_2=7/3$ ms (equal to the 3 ms processing time at 0 km minus the timing advance 1720 of ⅔ ms) corresponding to the time between the end of the time 1714 in which the sub-frame is received and a time 1716 at which a subsequent uplink sub-frame comprising a further payload data or a retransmission of the payload data transmitted during sub-frame 0 is to be transmitted. The process then repeats with the next uplink transmission occurring at time 1716. In the illustrated configuration, the base station is given 3 ms to process the received data before a transmission is to be performed and the UE is given 7/3 ms to perform the transmission.

As a result of the aforementioned techniques, the overall maximum separation distance between an antenna system (base station) and a further antenna system (UE) over which the antenna system and the further antenna system communicate can be increased. This is achieved by setting the timing advance such that it is within a predefined range and so that, for distances over which the round trip time is greater than the predefined range, the timing advance is set to differ from the round trip time by a duration of one or more sub-frames. In addition, for particularly long separation distances, the disclosed techniques define how to modify HARQ stop-and-wait processes in order to provide the base station with sufficient time to process received uplink data. Whilst the maximum operable separation distance can be increased through the adjustment of the timing advance (for example, as described in relation to FIG. 6), the combination of the modified HARQ stop-and wait processes (for example, as described in relation to FIG. 15) and the adjustment of the timing advance (for example, as described in relation to FIG. 6) provide, in combination, a system in which the maximum separation distance between an antenna system and a further antenna system is neither limited by the choice of communication standard that is used nor by the processing times of the circuitry connected to the antenna system and the further antenna system.

In brief overall summary there is provided an apparatus and method, the apparatus comprising an antenna system to communicate with a further antenna system. The apparatus includes computation circuitry to calculate a timing advance, restricted to a predefined range, to be applied by the further antenna system, to modify a transmission time for uplink data corresponding to a sub-frame relative to a reception time for downlink data corresponding to the sub-frame at the further antenna system. The computation circuitry is configured to estimate a round trip time, when the round trip time is within the predefined range, to set the timing advance based on the round trip time, and when the round trip time is outside of the predefined range, to set the timing advance to a value within the predefined range, wherein a difference between the value and the round trip time is based on a duration of one or more sub-frames.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations have been described in detail herein with reference to the accompanying drawings, it is to be understood that the invention is not limited to those precise configurations, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

Some configurations of the present techniques are described by the following numbered clauses:

Clause 1. An apparatus comprising:

an antenna system configured to communicate with a further antenna system of a wireless communication system during a transmission frame identifying a plurality of sub-frames;

computation circuitry configured to calculate a timing advance to be applied, by the further antenna system, to modify a time at which uplink data corresponding to a particular sub-frame of the plurality of sub-frames is transmitted by the further antenna system relative to a time at which downlink data corresponding to the particular sub-frame would be received by the further antenna system; and communication circuitry configured to transmit the timing advance to the further antenna system, wherein the timing advance is restricted to a predefined range, and the computation circuitry is configured:

to estimate a round trip time for a signal to travel twice a separation distance between the antenna system and the further antenna system;

in response to the round trip time being within the predefined range, to set the timing advance based on the round trip time; and in response to the round trip time being outside of the predefined range, to set the timing advance to a value within the predefined range, wherein a difference between the value and the round trip time is based on a duration of one or more sub-frames.

Clause 2. The apparatus of clause 1, wherein the communication circuitry is configured to receive an uplink communication transmitted from the further antenna system during a first predefined sub-frame of the plurality of sub-frames advanced by the timing advance and to transmit information indicative of receipt of the uplink communication during a second predefined sub-frame of the plurality of sub-frames.

Clause 3. The apparatus of clause 2, wherein an acknowledgement delay between the first predefined sub-frame and the second predefined sub-frame is set based on a maximum operable separation distance between the antenna system and the further antenna system.

Clause 4. The apparatus of clause 3, wherein the acknowledgement delay is equal to a predefined minimum number of sub-frames plus at least one additional sub-frame for each of the one or more sub-frames on which the duration is based.

Clause 5. The apparatus of clause 3 or clause 4, wherein a total number of sub-frames in the transmission frame is determined based on the acknowledgement delay and a retransmission delay defined as a default number of sub-frames between the second predefined sub-frame and a next first predefined sub-frame.

Clause 6. The apparatus of clause 5, wherein at least one of:

the acknowledgement delay comprises a processing time associated with decoding the uplink communication; and the retransmission delay comprises a processing time associated with decoding the downlink communication.

Clause 7. The apparatus of any of clause 3 to clause 6, wherein a maximum round trip time for a signal to travel twice the maximum operable distance is greater than the predefined range.

Clause 8. The apparatus of any preceding clause, wherein the communication circuitry is configured to transmit a downlink communication to the further antenna system during a third predefined sub-frame of the plurality of sub-frames and to receive information indicative receipt of the downlink communication transmitted from the further antenna system during a fourth predefined sub-frame of the plurality of sub-frames advanced by the timing advance.

Clause 9. The apparatus of clause 8 when dependent on clause 2, wherein the third predefined sub-frame and the fourth predefined sub-frame are separated by a same number of sub-frames as the first predefined sub-frame and the second predefined sub-frame.

Clause 10. The apparatus of any preceding clause, wherein in response to the round trip time being outside of the predefined range, the computation circuitry is configured to determine the value by subtracting the duration of one or more sub-frames from the round trip time.

Clause 11. The apparatus of any preceding clause, wherein the antenna system and the further antenna system are configured to communicate according to a HARQ process.

Clause 12. The apparatus of clause 11, wherein the antenna system and the further antenna system are configured to communicate using a plurality of stop-and-wait HARQ processes.

Clause 13. The apparatus of any preceding clause, wherein the predefined range is determined based on a wireless communication standard.

Clause 14. The apparatus of any preceding clause, wherein the predefined range is between a minimum time advance and a maximum time advance, and the minimum time advance is a negative time advance.

Clause 15. A wireless communication system comprising:

a further antenna system configured to communicate with an antenna system;

communication circuitry configured to control the further antenna system to communicate with the antenna system during a transmission frame identifying a plurality of sub-frames; and control circuitry responsive to reception, from the antenna system, of information identifying a timing advance, to control the further antenna system to apply the timing advance to modify a time at which uplink data corresponding to a particular sub-frame of the plurality of sub-frames is transmitted by the further antenna system relative to a time at which downlink data corresponding to the particular sub-frame would be received by the further antenna system, wherein the timing advance is restricted to a predefined range, and the timing advance is calculated by computation circuitry of the antenna system that is configured:

to estimate a round trip time for a signal to travel twice a separation distance between the antenna system and the further antenna system;

in response to the round trip time being within the predefined range, to set the timing advance based on the round trip time; and in response to the round trip time being outside of the predefined range, to set the timing advance to a value within the predefined range, wherein a difference between the value and the round trip time is based on a duration of one or more sub-frames.

Clause 16. The wireless communication system of clause 15, wherein the communication circuitry is configured to transmit an uplink communication to the antenna system during a first predefined sub-frame of the plurality of sub-frames advanced by the timing advance and to receive information indicative of receipt of the uplink communication from the antenna system during a second predefined sub-frame of the plurality of sub-frames.

Clause 17. The wireless communication system of clause 16, wherein an acknowledgement delay between the first predefined sub-frame and the second predefined sub-frame is set based on a maximum operable separation distance between the antenna system and the further antenna system.

Clause 18. The wireless communication system of clause 17, wherein the acknowledgement delay is equal to a predefined minimum number of sub-frames plus at least one additional sub-frame for each of the one or more sub-frames on which the duration is based.

Clause 19. The wireless communication system of any of clause 16 to clause 18, wherein a total number of sub-frames in the transmission frame is determined based on the acknowledgement delay and a retransmission delay defined as a default number of sub-frames between the second predefined sub-frame and a next first predefined sub-frame.

Clause 20. The wireless communication system of any of clause 18 to clause 19, wherein a maximum round trip time for a signal to travel twice the maximum operable distance is greater than the predefined range.

Clause 21. The wireless communication system of any of clause 15 to clause 20, wherein the communication circuitry is configured to receive a downlink communication from the antenna system during a third predefined sub-frame of the plurality of sub-frames advanced by the timing advance and to transmit information indicative receipt of the downlink communication transmitted from the antenna system during a fourth predefined sub-frame of the plurality of sub-frames.

Clause 22. The wireless communication system of any of clause 15 to clause 21, wherein the wireless communication system is mounted on a moving vehicle.

Clause 23. The wireless communication system of clause 22, wherein the moving vehicle is an aircraft.

Clause 24. A method of operating an apparatus comprising an antenna system configured to communicate with a further antenna system of a wireless communication system during a transmission frame identifying a plurality of sub-frames, wherein the method comprises:

calculating a timing advance to be applied, by the further antenna system, to modify a time at which uplink data corresponding to a particular sub-frame of the plurality of sub-frames is transmitted by the further antenna system relative to a time at which downlink data corresponding to the particular sub-frame would be received by the further antenna system, wherein the timing advance is restricted to a predefined range;

transmitting the timing advance to the further antenna system;

estimating a round trip time for a signal to travel twice a separation distance between the antenna system and the further antenna system;

in response to the round trip time being within the predefined range, setting the timing advance based on the round trip time; and in response to the round trip time being outside of the predefined range, setting the timing advance to a value within the predefined range, wherein a difference between the value and the round trip time is based on a duration of one or more sub-frames.

Clause 25. A method of operating a wireless communication system comprising a further antenna system configured to communicate with an antenna system, the method comprising:

controlling the further antenna system to communicate with the antenna system during a transmission frame identifying a plurality of sub-frames; and in response to reception, from the antenna system, of information identifying a timing advance, controlling the further antenna system to apply the timing advance to modify a time at which uplink data corresponding to a particular sub-frame of the plurality of sub-frames is transmitted by the further antenna system relative to a time at which downlink data corresponding to the particular sub-frame would be received by the further antenna system, wherein the timing advance is restricted to a predefined range, and the timing advance is calculated, at the antenna system by:

estimating a round trip time for a signal to travel twice a separation distance between the antenna system and the further antenna system;

in response to the round trip time being within the predefined range, setting the timing advance based on the round trip time; and in response to the round trip time being outside of the predefined range, setting the timing advance to a value within the predefined range, wherein a difference between the value and the round trip time is based on a duration of one or more sub-frames.

The invention claimed is:

1. An apparatus comprising:

an antenna system configured to communicate with a further antenna system of a wireless communication system during a transmission frame identifying a plurality of sub-frames;

computation circuitry configured to calculate a timing advance to be applied, by the further antenna system, to modify a time at which uplink data corresponding to a particular sub-frame of the plurality of sub-frames is transmitted by the further antenna system relative to a time at which downlink data corresponding to the particular sub-frame would be received by the further antenna system; and communication circuitry configured to transmit the timing advance to the further antenna system, wherein the timing advance is restricted to a predefined range, and the computation circuitry is configured:

to estimate a round trip time for a signal to travel twice a separation distance between the antenna system and the further antenna system;

in response to the round trip time being within the predefined range, to set the timing advance based on the round trip time; and in response to the round trip time being outside of the predefined range, to set the timing advance to a value within the predefined range, wherein a difference between the value and the round trip time is based on a duration of one or more sub-frames.

2. The apparatus of claim 1, wherein the communication circuitry is configured to receive an uplink communication transmitted from the further antenna system during a first predefined sub-frame of the plurality of sub-frames advanced by the timing advance and to transmit information indicative of receipt of the uplink communication during a second predefined sub-frame of the plurality of sub-frames.

3. The apparatus of claim 2, wherein an acknowledgement delay between the first predefined sub-frame and the second predefined sub-frame is set based on a maximum operable separation distance between the antenna system and the further antenna system.

4. The apparatus of claim 3, wherein the acknowledgement delay is equal to a predefined minimum number of sub-frames plus at least one additional sub-frame for each of the one or more sub-frames on which the duration is based.

5. The apparatus of claim 3, wherein a total number of sub-frames in the transmission frame is determined based on the acknowledgement delay and a retransmission delay defined as a default number of sub-frames between the second predefined sub-frame and a next first predefined sub-frame.

6. The apparatus of claim 5, wherein at least one of:

the acknowledgement delay comprises a processing time associated with decoding the uplink communication; and the retransmission delay comprises a processing time associated with decoding the downlink communication.

7. The apparatus of any of claim 3, wherein a maximum round trip time for a signal to travel twice the maximum operable distance is greater than the predefined range.

8. The apparatus of claim 1, wherein the communication circuitry is configured to transmit a downlink communication to the further antenna system during a third predefined sub-frame of the plurality of sub-frames and to receive information indicative receipt of the downlink communication transmitted from the further antenna system during a fourth predefined sub-frame of the plurality of sub-frames advanced by the timing advance.

9. The apparatus of claim 8, wherein:

the communication circuitry is configured to receive an uplink communication transmitted from the further antenna system during a first predefined sub-frame of the plurality of sub-frames advanced by the timing advance and to transmit information indicative of receipt of the uplink communication during a second predefined sub-frame of the plurality of sub-frames; and the third predefined sub-frame and the fourth predefined sub-frame are separated by a same number of sub-frames as the first predefined sub-frame and the second predefined sub-frame.

10. The apparatus of claim 1, wherein in response to the round trip time being outside of the predefined range, the computation circuitry is configured to determine the value by subtracting the duration of one or more sub-frames from the round trip time.

11. The apparatus of claim 1, wherein the antenna system and the further antenna system are configured to communicate according to a HARQ process.

12. The apparatus of claim 11, wherein the antenna system and the further antenna system are configured to communicate using a plurality of stop-and-wait HARQ processes.

13. A wireless communication system comprising:

a further antenna system configured to communicate with an antenna system;

communication circuitry configured to control the further antenna system to communicate with the antenna system during a transmission frame identifying a plurality of sub-frames; and control circuitry responsive to reception, from the antenna system, of information identifying a timing advance, to control the further antenna system to apply the timing advance to modify a time at which uplink data corresponding to a particular sub-frame of the plurality of sub-frames is transmitted by the further antenna system relative to a time at which downlink data corresponding to the particular sub-frame would be received by the further antenna system, wherein the timing advance is restricted to a predefined range, and the timing advance is calculated by computation circuitry of the antenna system that is configured:

to estimate a round trip time for a signal to travel twice a separation distance between the antenna system and the further antenna system;

in response to the round trip time being within the predefined range, to set the timing advance based on the round trip time; and in response to the round trip time being outside of the predefined range, to set the timing advance to a value within the predefined range, wherein a difference between the value and the round trip time is based on a duration of one or more sub-frames.

14. The wireless communication system of claim 13, wherein the communication circuitry is configured to transmit an uplink communication to the antenna system during a first predefined sub-frame of the plurality of sub-frames advanced by the timing advance and to receive information indicative of receipt of the uplink communication from the antenna system during a second predefined sub-frame of the plurality of sub-frames.

15. The wireless communication system of claim 14, wherein an acknowledgement delay between the first predefined sub-frame and the second predefined sub-frame is set based on a maximum operable separation distance between the antenna system and the further antenna system.

16. The wireless communication system of claim 15, wherein the acknowledgement delay is equal to a predefined minimum number of sub-frames plus at least one additional sub-frame for each of the one or more sub-frames on which the duration is based.

17. The wireless communication system of claim 14, wherein a total number of sub-frames in the transmission frame is determined based on the acknowledgement delay and a retransmission delay defined as a default number of sub-frames between the second predefined sub-frame and a next first predefined sub-frame.

18. The wireless communication system of claim 13, wherein the communication circuitry is configured to receive a downlink communication from the antenna system during a third predefined sub-frame of the plurality of sub-frames advanced by the timing advance and to transmit information indicative receipt of the downlink communication transmitted from the antenna system during a fourth predefined sub-frame of the plurality of sub-frames.

19. A method of operating an apparatus comprising an antenna system configured to communicate with a further antenna system of a wireless communication system during a transmission frame identifying a plurality of sub-frames, wherein the method comprises:

calculating a timing advance to be applied, by the further antenna system, to modify a time at which uplink data corresponding to a particular sub-frame of the plurality of sub-frames is transmitted by the further antenna system relative to a time at which downlink data corresponding to the particular sub-frame would be received by the further antenna system, wherein the timing advance is restricted to a predefined range;

transmitting the timing advance to the further antenna system;

estimating a round trip time for a signal to travel twice a separation distance between the antenna system and the further antenna system;

in response to the round trip time being within the predefined range, setting the timing advance based on the round trip time; and in response to the round trip time being outside of the predefined range, setting the timing advance to a value within the predefined range, wherein a difference between the value and the round trip time is based on a duration of one or more sub-frames.

20. A method of operating a wireless communication system comprising a further antenna system configured to communicate with an antenna system, the method comprising:

controlling the further antenna system to communicate with the antenna system during a transmission frame identifying a plurality of sub-frames; and in response to reception, from the antenna system, of information identifying a timing advance, controlling the further antenna system to apply the timing advance to modify a time at which uplink data corresponding to a particular sub-frame of the plurality of sub-frames is transmitted by the further antenna system relative to a time at which downlink data corresponding to the particular sub-frame would be received by the further antenna system, wherein the timing advance is restricted to a predefined range, and the timing advance is calculated, at the antenna system by:

estimating a round trip time for a signal to travel twice a separation distance between the antenna system and the further antenna system;

in response to the round trip time being within the predefined range, setting the timing advance based on the round trip time; and in response to the round trip time being outside of the predefined range, setting the timing advance to a value within the predefined range, wherein a difference between the value and the round trip time is based on a duration of one or more sub-frames.

* * * * *